United States Patent
Kato et al.

[11] Patent Number: 5,725,448
[45] Date of Patent: Mar. 10, 1998

[54] IDLER PULLEY

[75] Inventors: Yoshio Kato, Iwara; Motoharu Niki, Iwata; Tsutomu Mizutani, Mie-ken; Tadahisa Suzuki, Tenryu; Yoshiaki Suzuki, Iwata; Masahiro Muranaka, Iwata; Takahiro Koremoto, Iwata; Masao Fukuwaka, Iwata, all of Japan

[73] Assignee: NTN Corporation, Osaka, Japan

[21] Appl. No.: 696,905

[22] PCT Filed: Dec. 27, 1995

[86] PCT No.: PCT/JP95/02717

§ 371 Date: Nov. 1, 1996

§ 102(e) Date: Nov. 1, 1996

[87] PCT Pub. No.: WO96/20362

PCT Pub. Date: Jul. 4, 1996

[30] Foreign Application Priority Data

Dec. 28, 1994 [JP] Japan .................. 6-326786
Dec. 28, 1994 [JP] Japan .................. 6-328673
Dec. 28, 1994 [JP] Japan .................. 6-328688
Dec. 28, 1994 [JP] Japan .................. 6-328710
Dec. 28, 1994 [JP] Japan .................. 6-329010

[51] Int. Cl.$^6$ ............................ F16H 55/36
[52] U.S. Cl. .................. 474/43; 474/199; 384/510
[58] Field of Search ............... 474/43, 44, 112, 474/199; 384/510

[56] References Cited

U.S. PATENT DOCUMENTS

| | | |
|---|---|---|
| 3,918,277 | 11/1975 | Nakk. |
| 4,265,133 | 5/1981 | Van Der Meulen et al. ...... 474/171 X |
| 4,917,655 | 4/1990 | Martin ........................... 474/112 |
| 4,938,732 | 7/1990 | Krude ........................... 474/56 X |

Primary Examiner—Roger J. Schoeppel
Attorney, Agent, or Firm—Nikaido, Marmelstein, Murray & Oram LLP

[57] ABSTRACT

This idler pulley includes a pulley body 1 made, e.g., by pressing a steel plate, and a ball bearing 2 fitted in the inner diameter of the pulley body 1. The contact position Z on the pulley peripheral surface 1a1 of the pulley body to be contacted by the belt center and the bearing centerline Y of the ball bearing 2 are axially offset by an amount δ.

9 Claims, 22 Drawing Sheets

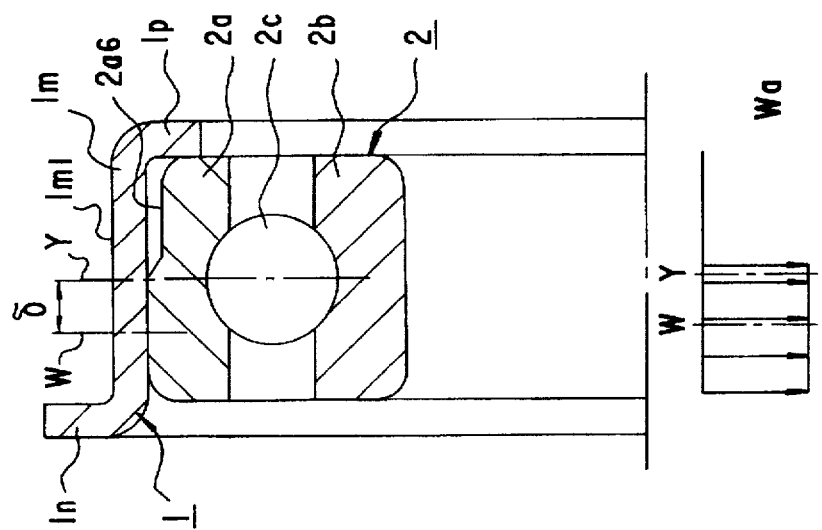
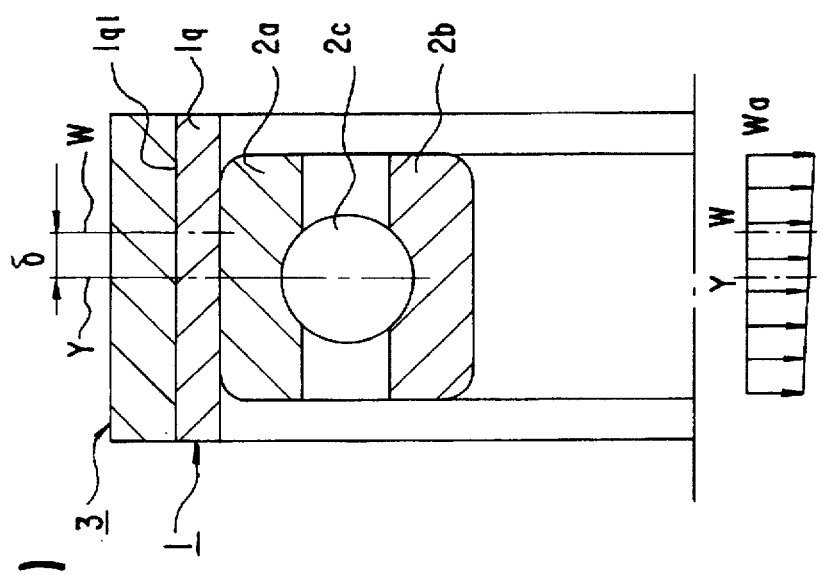
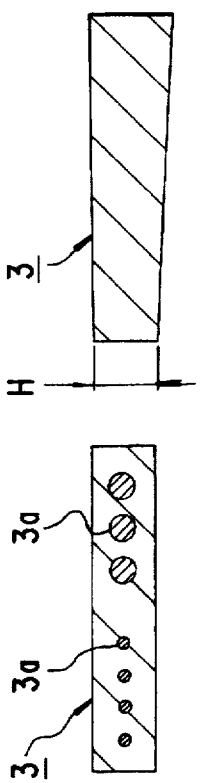

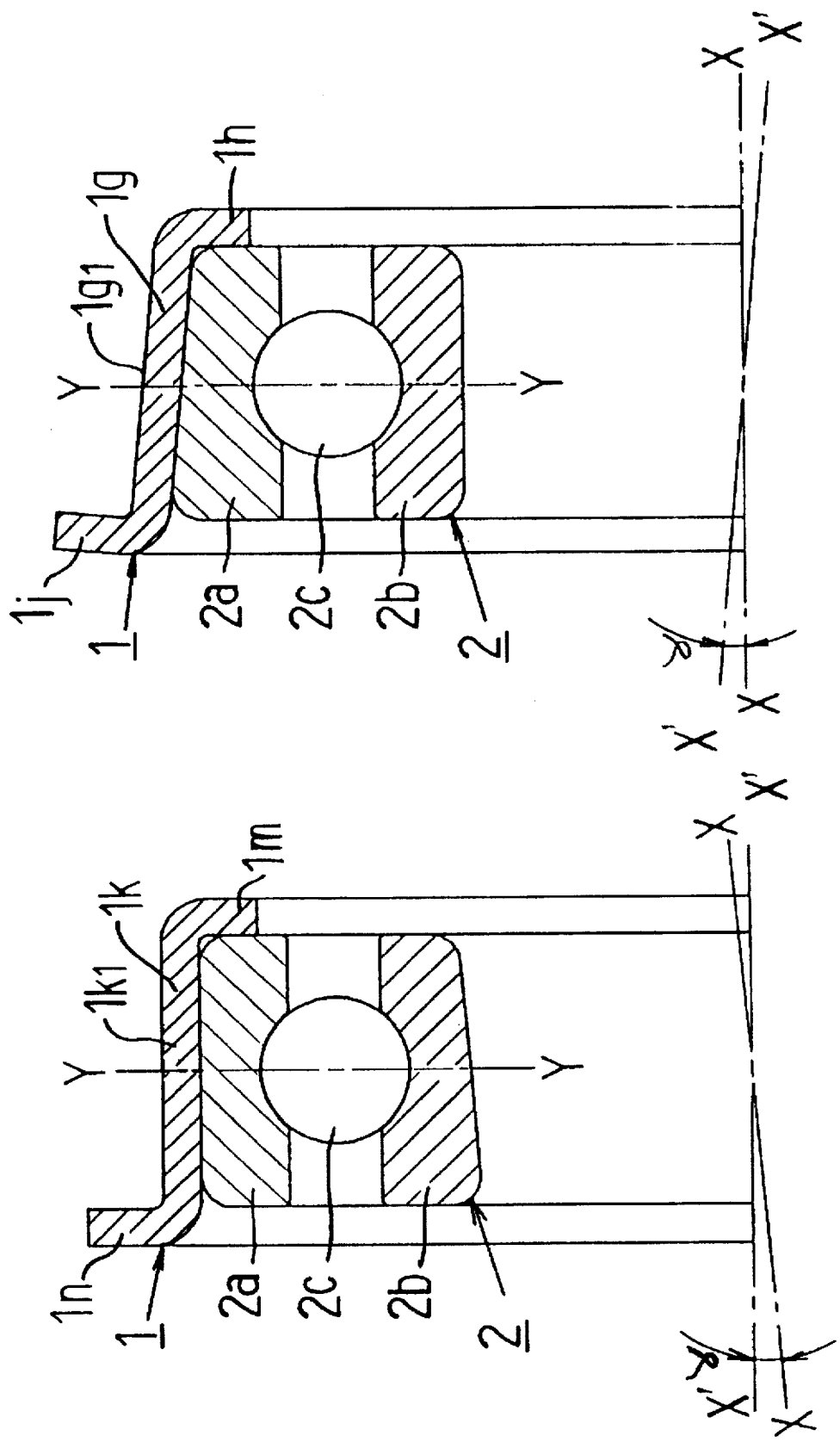

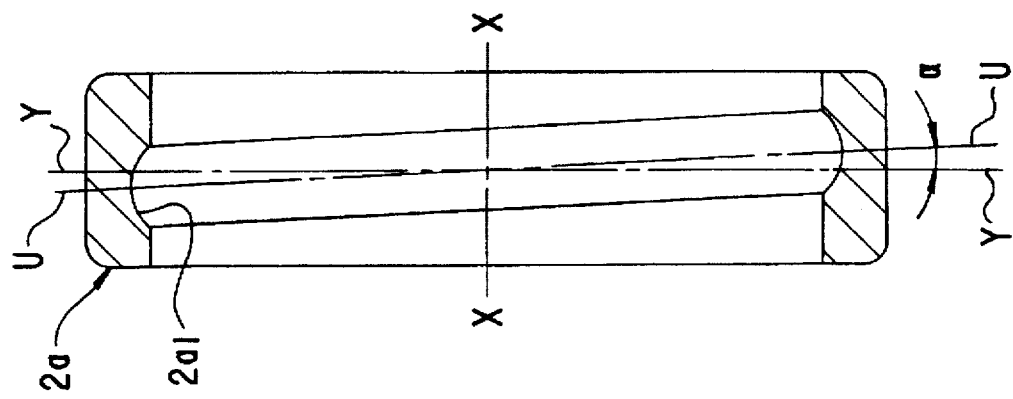
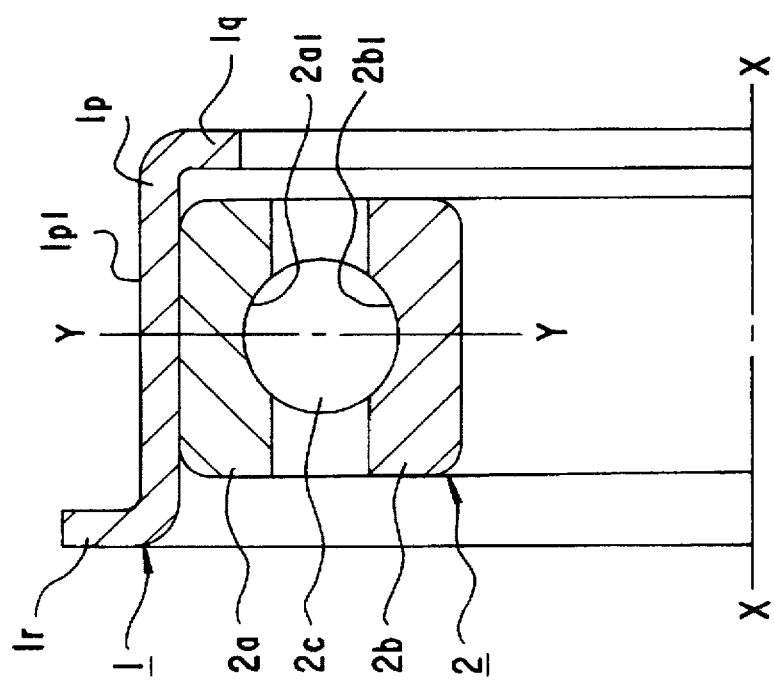

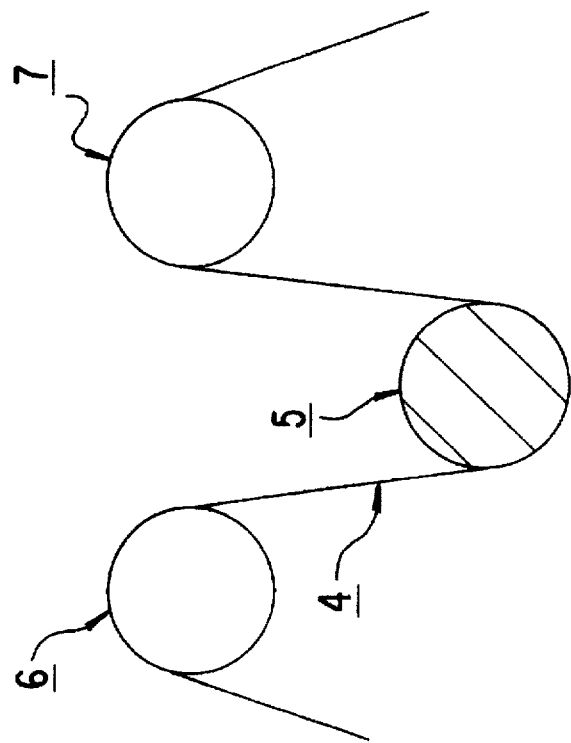
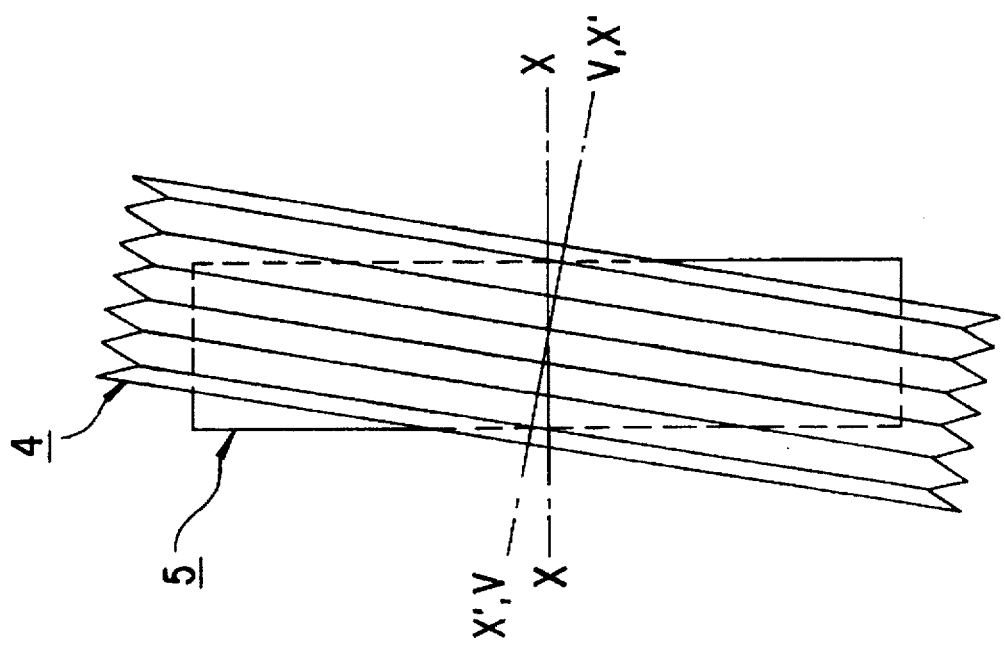

Fig.30

| OFFSET AMOUNT (δ') mm | 0 | 1.8 | 2.0 | 3.0 | 4.0 | 5.0 | 8.2 |
|---|---|---|---|---|---|---|---|
| PERCENTAGE OCCURRENCE OF COLD TIME ABNORMAL SOUND | 40 | 60 | 10 | 0 | 0 | 0 | 0 |

BEARING FOR TESTING : 6203
NUMBER OF REVOLUTIONS : 2100 r/min
LOAD : 294 N (30kgf)
TEMPERATURE OF BEARING : -20°C
SEALED GREASE : A

Fig.31

| OFFSET AMOUNT (δ') mm | 0 | 1.8 | 2.0 | 3.0 | 4.0 | 5.0 | 8.2 |
|---|---|---|---|---|---|---|---|
| PERCENTAGE OCCURRENCE OF COLD TIME ABNORMAL SOUND | 65 | 70 | 30 | 0 | 0 | 0 | 0 |

BEARING FOR TESTING : 6203
NUMBER OF REVOLUTIONS : 2100 r/min
LOAD : 294 N (30kgf)
TEMPERATURE OF BEARING : -20°C
SEALED GREASE : B

Fig.32
PRIOR ART

| NAME OF BEARING INCORPORATED IN PULLEY | NUMBER OF PULLEY FOR TESTING AND EVALUATION | NUMBER OF OCCURRENCE OF COLD TIME ABNORMAL SOUND | PERCENTAGE OCCURRENCE OF COLD TIME ABNORMAL SOUND |
|---|---|---|---|
| BEARING A | 8 | 2 | 25 |
| BEARING B | 32 | 11 | 34 |

BEARING A : DOUBLE-ROW ANGULAR CONTACT BALL BEARING
(CONTACT ANGLE $\alpha$ = 30°)
BEARING B : DEEP GROOVE BALL BEARING
NUMBER OF REVOLUTIONS : 2100 r/min
LOAD : 294 N (30kgf)
TEMPERATURE OF BEARING : -20°C

Fig.33
PRIOR ART

| NAME OF SEALED GREASE | VISCOSITY OF SEALED GREASE | NUMBER OF PULLEY FOR TESTING AND EVALUATION | NUMBER OF OCCURRENCE OF COLD TIME ABNORMAL SOUND | PERCENTAGE OCCURRENCE OF COLD TIME ABNORMAL SOUND (%) |
|---|---|---|---|---|
| GREASE A | LOW | 20 | 8 | 40 |
| GREASE B | HIGH | 20 | 13 | 65 |

BEARING FOR TESTING : 6203
NUMBER OF REVOLUTIONS : 2100 r/min
LOAD : 294 N (30kgf)
TEMPERATURE OF BEARING : -20°C

IDLER PULLEY

BACKGROUND OF THE INVENTION

The present invention relates to an idler pulley, particularly to an idler pulley engaged with a timing belt or auxiliary machine driving belt for automobiles. An idler pulley is used with a timing belt for automobile engines to increase the belt wrapping angle and to impart a suitable tension to the belt. Idler pulleys include one (hat type outer race) in the form in which the pulley peripheral surface to be contacted by the belt is provided directly on the outer diameter of the outer race of a ball bearing and another, which is in frequent use, in the form in which as shown in FIG. 23 a pulley body 11 having a pulley peripheral surface 11a1 and a ball bearing 12 are integrally fitted together.

The pulley body 11 is made by pressing a steel plate, having an outer diameter cylindrical portion 11a and an inner diameter cylindrical portion 11b for having the outer race 12b of the ball bearing 12 fitted therein. The pulley peripheral surface 11a1 is disposed on the outer diameter of the outer diameter cylindrical portion 11a. The ball bearing 12 is a deep groove ball bearing comprising an outer race 12b fitted in the inner diameter cylindrical portion 11b of the pulley body 11, an inner race 12a fitted on a fixed shaft (omitted from illustration), a plurality of balls 12c held between the raceway surface of the inner race 12a and the raceway surface of the outer race 12b, a retainer 12d for holding the balls 12c, and a seal 12e for sealing the grease.

In this kind of idler pulley, when the pulley body 11 is rotated under torque from the belt, the outer race 12b of the ball bearing 12 fitted therein rotates with the pulley body 11.

In idler pulleys of the type described above, it is common practice to provide an arrangement in which the load center of a belt load coincides with the bearing center line Y of the ball bearing 12 and in which the pulley rotation axis Z coincides with the fixed axis X. This arrangement, which is intended to avoid undesirable effects on the ball bearing 12 as the belt load would otherwise act as localized load on the ball bearing 12, should be said to be a basic machine design which has heretofore been adopted. Further, the ball bearing 12 is usually a deep groove ball bearing and it is common practice not to use a preloaded bearing. This is believed to have stemmed from an anxiety about undesirable effects brought about by the use of bearings under preload.

In this connection, it is to be noted that the use of an idler pulley described above in cold time is sometimes attended by an abnormal sound (hoot sound). This abnormal sound in cold time, the so-called cold time abnormal sound, does not always occur in the market but, depending on temperature, etc., it occurs in restricted areas; For example, in Japan, it occurs in Hokkaido. Further, it occurs only for a short time (about 1 minute at most) from the time after the engine is started; thenceforth it never occurs. The cold time abnormal sound has such complicated properties and is difficult to reproduce; therefore, the cause has not been elucidated. Furthermore, idler pulleys used in automobiles and the like operate under high temperature high speed conditions, and their durability is one of the important characteristics and hence counter measures which would lead to a decrease in durability cannot be taken. For such reason, at present, there has been provided no effective means to solve the problem of cold time abnormal sound in idler pulleys. Heretofore, the use of grease having superior low temperature characteristics (which grease will form oil films evenly on areas of contact between the rolling elements and the raceway surfaces of the inner and outer race in cold time) in bearings as a measure against cold time abnormal sound has been taken into consideration. This measure aims at suppressing the occurrence of cold time abnormal sound by enhancing the lubricating performance of the grease in cold time, and a substantial effect can be expected. However, since the viscosity of grease decreases, there is an anxiety about the lubricating performance at high temperature, with a possibility of leading to a decrease in durability.

Further, it is reported that the occurrence of cold time abnormal sound is suppressed by increasing the radii of curvature of the raceway surfaces of the inner and outer races or by increasing the bearing clearance. However, the occurrence of cold time abnormal sound has not been completely prevented, and an increases in the radii of curvature of the raceway surfaces or in the bearing clearance will result in increasing the angle runout, impairing the function of the idler pulley.

Further, there are an embodiment (Japanese Utility Model Kokai Hei 3-41247) in which a member (a rubber-like elastic body) having a sound absorbing effect is mounted on the boss portion (the portion in which the outer race of a ball bearing is fitted) of a pulley body, and an embodiment (Japanese Utility Model Kokai Sho 62-91056) in which an elastic body is interposed between the inner diameter of a pulley body and the outer diameter of a bearing case in which a ball bearing is fitted. These embodiments are intended to absorb self-oscillation of a bearing which is considered to be the cause of cold time abnormal sound by utilizing the internal damping property of an elastic body; however, the internal damping property is liable to decrease in cold time and hence it is uncertain whether an effect which is sufficient for a measure against cold time abnormal sound can be expected.

SUMMARY OF THE INVENTION

An object of the present invention is to provide means which is capable of effectively suppressing or preventing the occurrence of cold time abnormal sound while securing the durability of an idler pulley and the function of a pulley and while taking an aspect of cost into account.

In cold time, unevenness or nonuniformity of oil films on the raceway surfaces is liable to occur owing to an increase in the base oil viscosity and a decrease in the working penetration of grease. If oil films are uneven or nonuniform, the coefficient of friction between the rolling elements and the raceway surfaces undergoes a slight periodic change, which causes self-excitation of the rolling elements. Particularly, if there are breaks in oil films, the rolling elements stick-slip in the broken portions, periodically repeating a change of state between rolling and slippage, with the result that the amplitude of self-oscillation of the rolling elements becomes greater at a certain frequency. Furthermore, in the case of a deep groove ball bearing, at a point of time when the rolling elements, under radial load, move from a loaded zone to a no-load zone and vice versa, their behavior becomes unstable (including delayed and too fast movements, etc., of the rolling elements), a fact which further promotes self-excitation. And it is believed that an abnormal sound is produced in the areas of contact between such self-excitation rolling elements and the raceway surfaces of the inner and outer races. Further, the self-excitation of the rolling elements is transmitted to the pulley body via the outer race, sometimes amplified as it resonates with the natural oscillation, until it appears as an amplified resonant sound.

Although the mechanism of generation of cold time abnormal sound has not been elucidated, it is believed that the self-excitation of the rolling elements forms a major factor, as described above. On the basis of such reasoning, some verifications have been made and the following phenomena have been found (see FIGS. 32 and 33).

(1) As compared with an idler pulley having a bearing B (deep groove ball bearing) incorporated therein, an idler pulley having a bearing A (double-row angular contact ball bearing) incorporated therein is low in the frequency of occurrence of cold time abnormal sound (see FIG. 32).

(2) An idler pulley having sealed therein a grease whose viscosity is high at low temperature has a higher possibility of occurrence of cold time abnormal sound than an idler pulley having sealed therein a grease whose viscosity is lower (see FIG. 33).

The above phenomena (1) and (2) endorse the reasoning that the degree of freedom of the rolling elements and the state of formation of oil films in cold time greatly influence the generation of cold time abnormal sound.

The present invention, based on the above reasoning and result of verifications, employs an arrangement wherein the rolling elements of a ball bearing in an idler pulley contact the raceway surfaces of the inner and outer races having a mutual predetermined inclination or an arrangement wherein the ball bearing is axially preloaded, thereby effectively suppressing or eliminating the generation of cold time abnormal sound.

The use of the arrangement wherein the rolling elements of a ball bearing in an idler pulley contact the raceway surfaces of the inner and outer races having a mutual predetermined inclination, ensures that the rolling elements contact the raceway surfaces of the inner and outer races at a contact angle (at a position deviated from the groove bottom) with a surface pressure greater than a predetermined value. Thus, the rolling elements have their behaviour, particularly axial behavior, suppressed, and even if they encounter an excitation causing factor, they hardly produce self-excitation. Furthermore, since the raceway surfaces of the inner and outer races have a predetermined angle of inclination, the angles of contact between the rolling elements and the inner and outer races differ according to the peripheral position of the rolling elements. This means that the axis of the rotation of each rolling element is incessantly changing as it revolves around the bearing axis. As the axis of the rotation is incessantly changing, fresh lubricant adhering to the rolling elements is fed to the areas of contact between them and the raceway surfaces at all times, making it easier for oil films to form, resulting in less periodic change in friction coefficient which forms a cause of excitation and in less stick-slip of the rolling elements.

It is believed that in the present invention the mechanism for effectively suppressing or preventing occurrence of cold time abnormal sound stems from interaction between such rolling element behavior suppressing function and the oil film formation promoting function. And by controlling the angle of inclination between the raceway surfaces of the inner and outer races, it becomes possible with extreme ease to make optimum setting and changing of conditions according to the environment and operating conditions.

The arrangements of the present invention described above include various forms as follows:

a) An arrangement wherein the belt center and the bearing centerline of the ball bearing are offset;

b) An arrangement wherein load center of the belt load and the bearing centerline of the ball bearing are offset;

c) An arrangement having an angle of inclination between the axis of rotation of the pulley and the axis of the fixed shaft;

d) An arrangement having an angle of inclination between the axis of the rotatable raceway surface and the axis of the fixed raceway surface.

Further, the use of an arrangement wherein the ball bearing is axially preloaded suppresses the behavior of the rolling elements, particularly their axial behavior, so that occurrence of cold time abnormal sound is effectively suppressed or prevented.

The effects of the present invention can be realized irrespective of the kind of the sealed grease; therefore, unlike the conventional construction using low-temperature grease or the like, there is no danger of leading to a decrease in high temperature durability. Further, since there are fewer factors which complicate the pulley construction, the arrangement is also cost-effective. In addition, it is believed that by setting said angle of inclination or the amount of preload at a value below the limit value, the balance with the requirement of durability, etc., can be attained.

BRIEF DESCRIPTION OF THE DRAWINGS

FIG. 11 is a sectional view showing an embodiment of the present invention;

FIGS. 12(a) through 12(c) are sectional views showing an embodiment of the present invention;

FIG. 16 is a sectional view showing an embodiment of the present invention;

FIG. 17 is a sectional view showing an embodiment of the present invention;

FIGS. 18(a) and 18(b) are sectional views showing an embodiment of the present invention;

FIGS. 21(a) and 21(b) are sectional views showing an embodiment of the present invention;

FIG. 30 is a table showing the relation between the offset amount and the percentage occurrence of cold time abnormal sound;

FIG. 31 is a table showing the relation between the offset amount and the percentage occurrence of cold time abnormal sound;

FIG. 32 is a table showing the results of investigation of the occurrence of cold time abnormal sound in a double-row angular ball bearing and a deep groove ball bearing; and FIG. 33 is a table showing the results of investigation of the occurrence of cold time abnormal sound in deep groove ball bearings having different greases sealed therein.

DESCRIPTION OF THE PREFERRED EMBODIMENTS

Embodiments of the present invention will now be described with reference to the drawings.

Embodiments shown in FIGS. 1 through 7 relate to an arrangement wherein the belt center and the bearing centerline Y of the ball bearing 2 are offset. Putting the belt center and the bearing centerline Y of the ball bearing 2 in offset relation to each other results in deviation, from the bearing centerline Y, of the load center of the radial load imposed by the belt. This deviation of the load center, in turn, results in a moment load acting on the ball bearing 2, inclining the outer race 2a. And when the outer race 2a is inclined by a predetermined amount with respect to the bearing centerline Y, a predetermined amount of inclination is produced between the raceway surfaces of the inner and outer races 2b and 2a, with the rolling elements (balls 2c) rolling while contacting the raceway surfaces of the inner and outer races 2b and 2a at a contact angle (at a position away from the groove bottom) with a surface pressure greater than a predetermined value.

Figure 1:
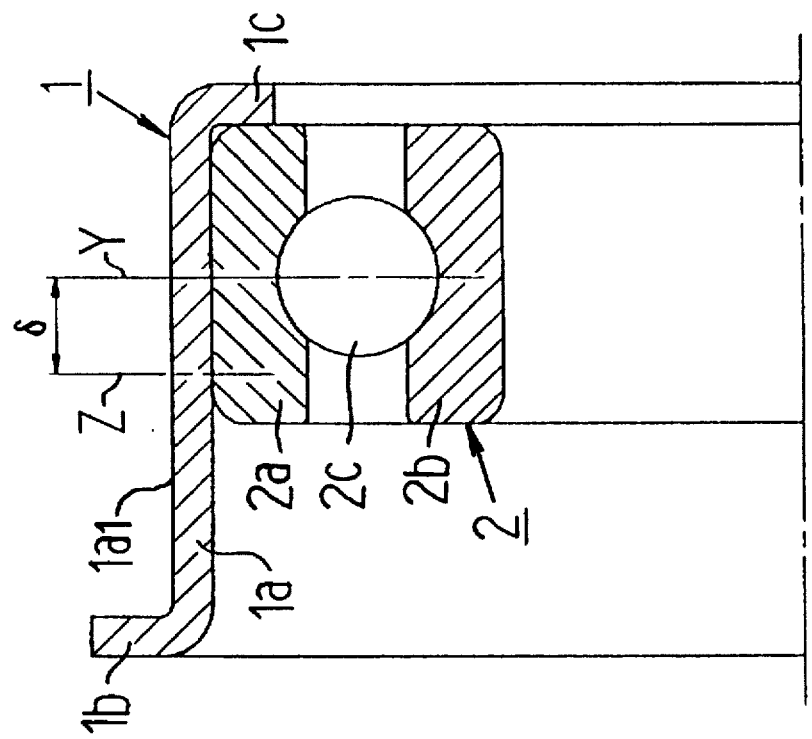
FIG. 1 is a sectional view showing an embodiment of the present invention.

An idler pulley shown in FIG. 1 is one used for auxiliary equipments driving belts for automobiles and the like. This idler pulley comprises a pulley body 1 made, e.g., of pressed steel plate, and a ball bearing 2 fitted in the inner diameter of the pulley body 1. The pulley body 1 is in the form of an annular body comprising a cylindrical portion 1a, a flange portion 1b extending outwardly from one end of the cylindrical portion 1a, and a flange portion 1c extending inwardly from the other end of the cylindrical portion 1a. The inner diameter of the cylindrical portion 1a has the outer race 2a of the ball bearing 2 fitted therein and the outer diameter of the cylindrical portion 1a is provided with a pulley peripheral surface 1a1 for contact with an unillustrated belt. The flange portion 1b is provided for guiding the belt which contacts the pulley peripheral surface 1a1. When the belt contacts the pulley peripheral surface 1a1, the pulley performs the function of an idler.

The ball bearing 2 is a deep groove ball bearing, comprising an outer race 2a fitted in the inner diameter of the cylindrical portion 1a of the pulley body 1, an inner race 2b fitted on an unillustrated fixed shaft, a plurality of balls 2c incorporated between the raceway surfaces of the inner and outer races 2b and 2a, a retainer (omitted from illustration) for holding the balls 2c at equal circumferential intervals, a pair of seals (omitted from illustration) for sealing the grease.

The contact position Z on the pulley peripheral surface 1a1 contacted by the belt center, and the bearing centerline Y of the ball bearing 2 are axially offset from each other by an amount $\delta$.

Figure 24:
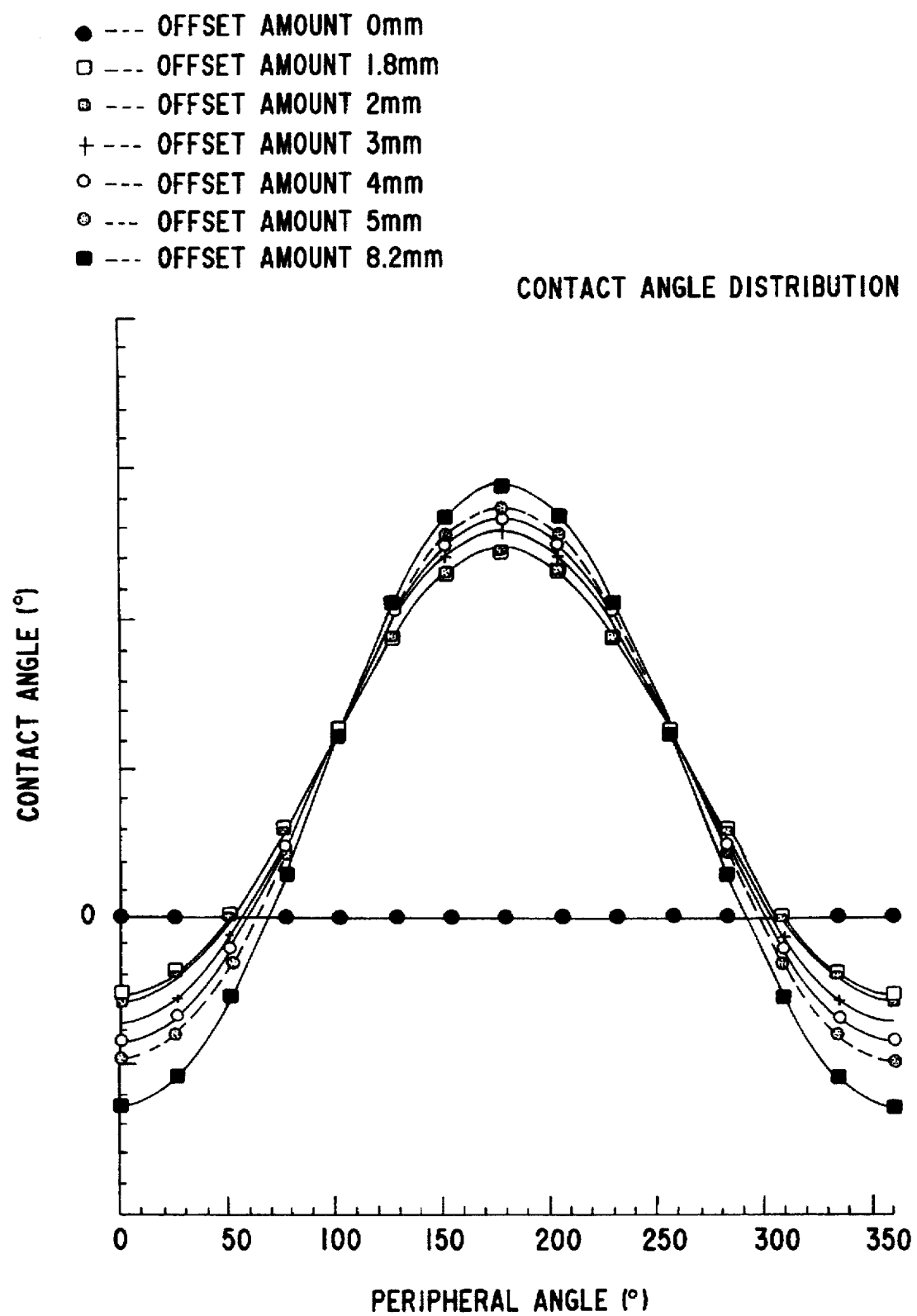
FIG. 24 is a graph showing the relation between the offset amount and the contact angle distribution.
Figure 25:
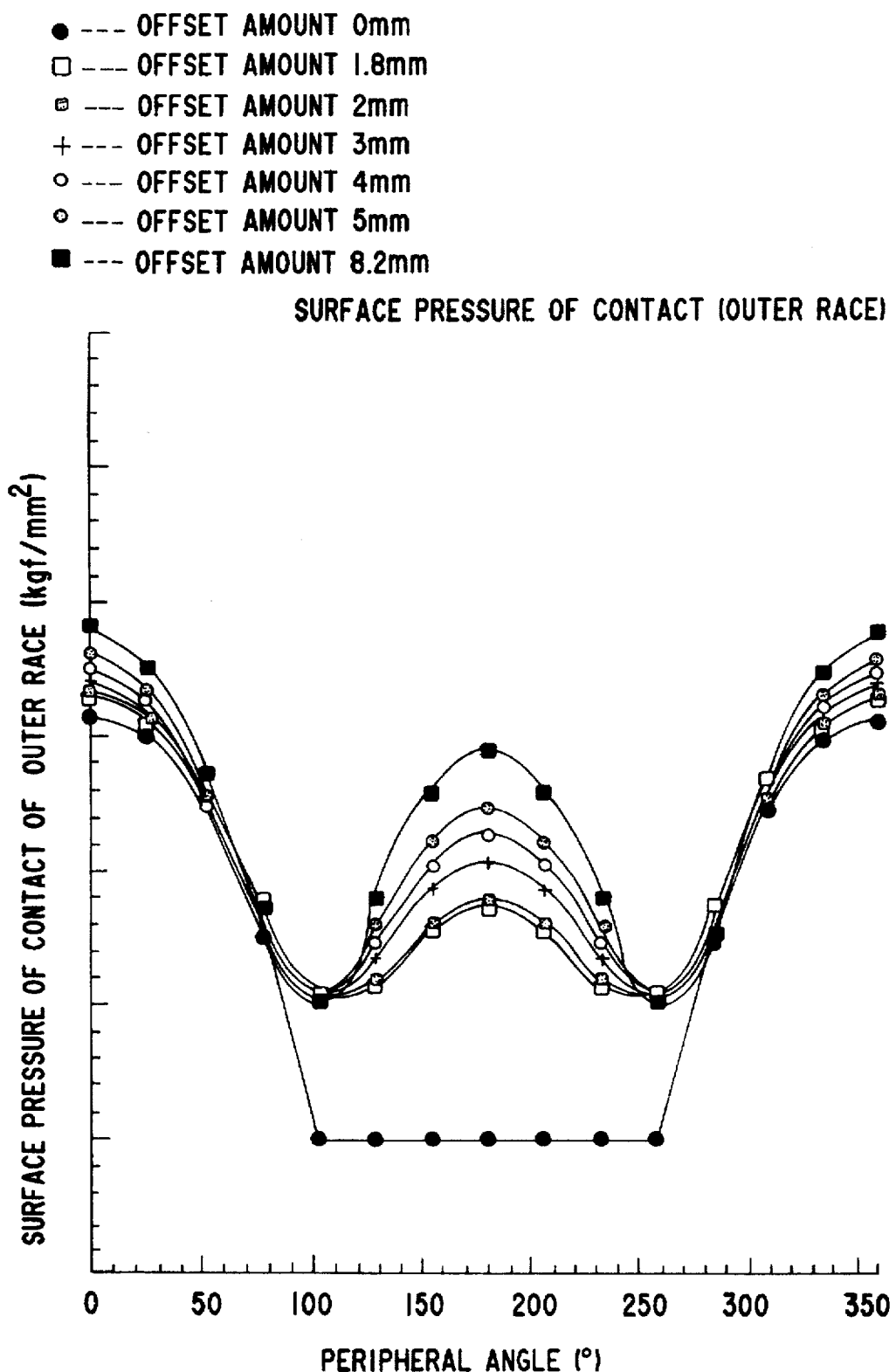
FIG. 25 is a graph showing the relation between the offset amount and the contact surface pressure on the outer race.
Figure 26:
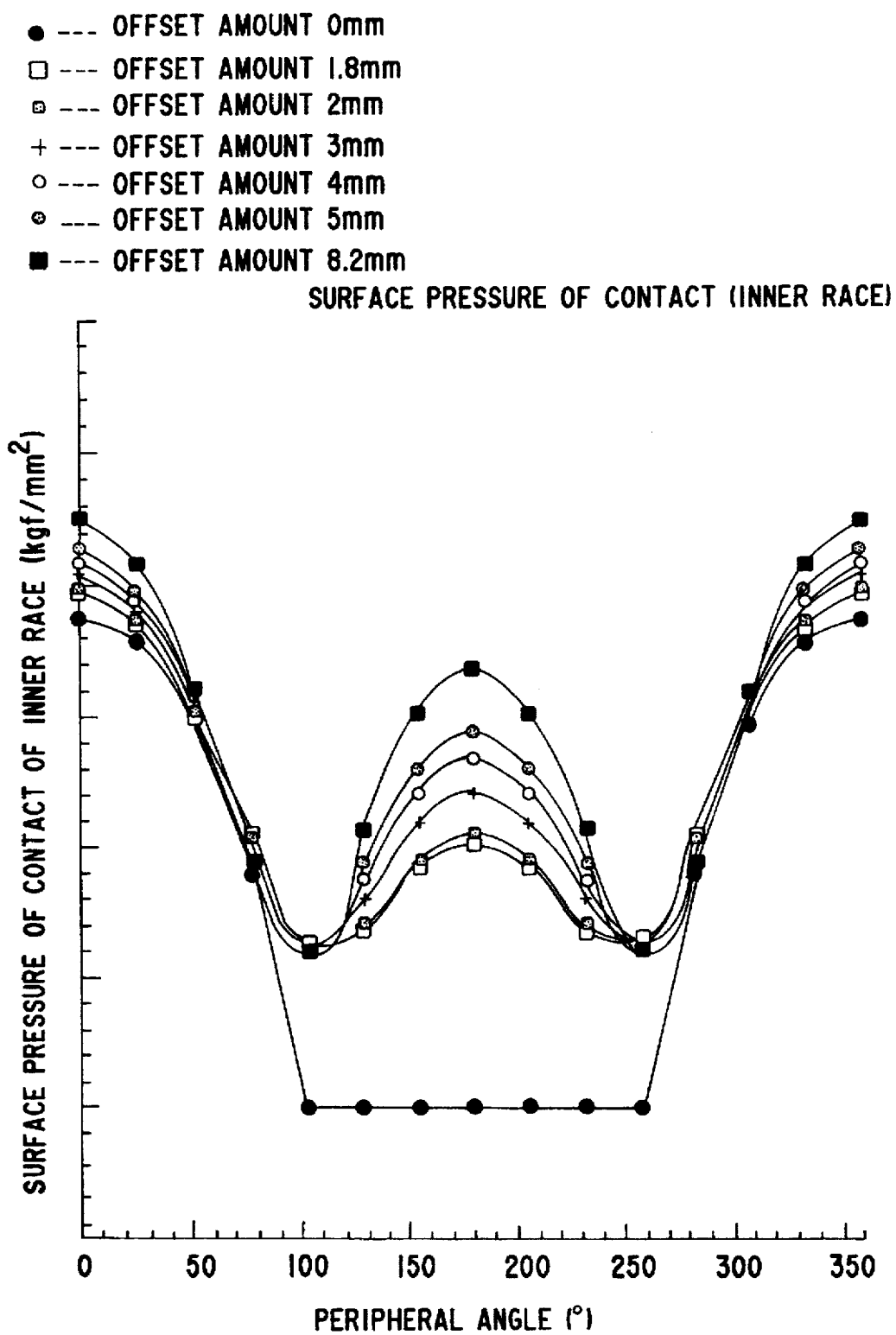
FIG. 26 is a graph showing the relation between the offset amount and the contact surface pressure on the inner race.

FIG. 24 shows the relation between the offset amount ($\delta'$) (amount of deviation between the belt center and the bearing centerline (during loading)) and the contact angle distribution, and FIGS. 25 and 26 show the relation between the offset amount ($\delta'$) and the surface pressure of contact between the outer and inner races 2a and 2b (analytical results). In addition, these analytical results refer to the case of using a deep groove ball bearing as the ball bearing 2, and an arrangement in which the offset amount=0 corresponds to a conventional idler pulley. Further, the peripheral angle (phase angle) in these figures is an angle measured around the fixed shaft with the contact center position (circumferential center position in an area of contact with the pulley peripheral surface) of the belt taken as the reference (0°).

First, the result shown in FIG. 24 indicates that in the arrangement in which the offset amount=0, the contact angle of the rolling elements (balls 2c) is zero at all peripheral angles but that in the arrangement provided with an offset amount, the rolling elements contact the raceway surfaces of the inner and outer races with contact angles formed for almost all peripheral angles. Furthermore, the contact angle of the rolling elements differs according to the peripheral angle (phase angle), a fact which means that the axis of rotation of each rolling element is incessantly changing with the revolution (planetary motion).

Next, the results shown in FIGS. 25 and 26 indicate that in the arrangement in which the offset amount=0, the contact surface pressure is zero in the non-loaded region for belt load (in the vicinity of a peripheral angle of 100°–250°) but that in the arrangement provided with an offset amount, the rolling elements contact the raceway surfaces of the inner and outer races with a contact surface pressure greater than a predetermined value in all regions including non-loaded regions. Particularly, a characteristic aspect is that a small peak state of contact surface pressure appears at a position with a peripheral angle of 180° which is farthest from the belt contact center position. This state corresponds to a contact angle distribution shown in FIG. 12.

As is clear from the above analytical results, in the idler pulleys according to the present embodiments, (1) all rolling elements contact the raceway surfaces of the inner and outer races at a contact angle, with a surface pressure greater than a predetermined value and (2) the axis of rotation of each rolling element (contact angle) is incessantly changing with the revolution hereof.

In addition, the above conditions (1) and (2) refer to optimum conditions for preventing the generation of cold time abnormal sound and there is no need that all the rolling elements come under said conditions (1) and (2); a substantial suppressing effect can be expected if at least those rolling elements which are in the load region for belt load (in the vicinity of a peripheral angle of 0°–100°, or 250°–360°) come under said conditions.

The idler pulley of the above arrangement was tested. The results are shown in FIGS. 27 through 31.

First, FIGS. 30 and 31 show the relation between the offset amount δ' (mm) and the percentage occurrence of cold time abnormal sound. FIG. 30 shows the test results in the case where grease A is filled in the ball bearing 2 and FIG. 31 shows the test results in the case where grease B is filled in the ball bearing 2. The operating conditions are the same for both cases.

In FIGS. 30 and 31, when the offset amount δ'=2.0 mm, the percentage occurrence of cold time abnormal sound sharply decreases, until it is zero when δ'=3.0 mm or above.

Figure 27:
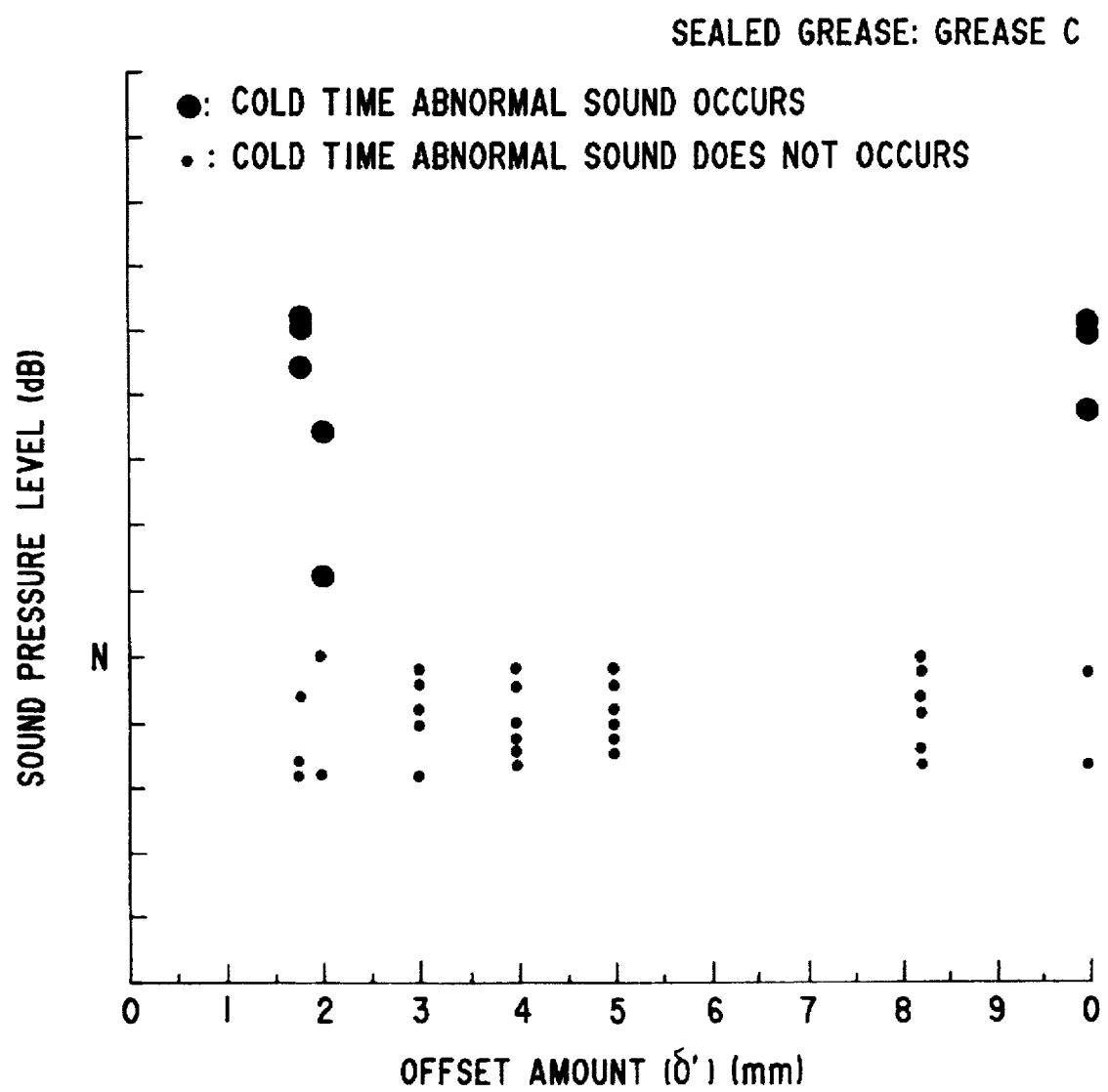
FIG. 27 is a graph showing the relation between the offset amount and the sound pressure level.
Figure 28:
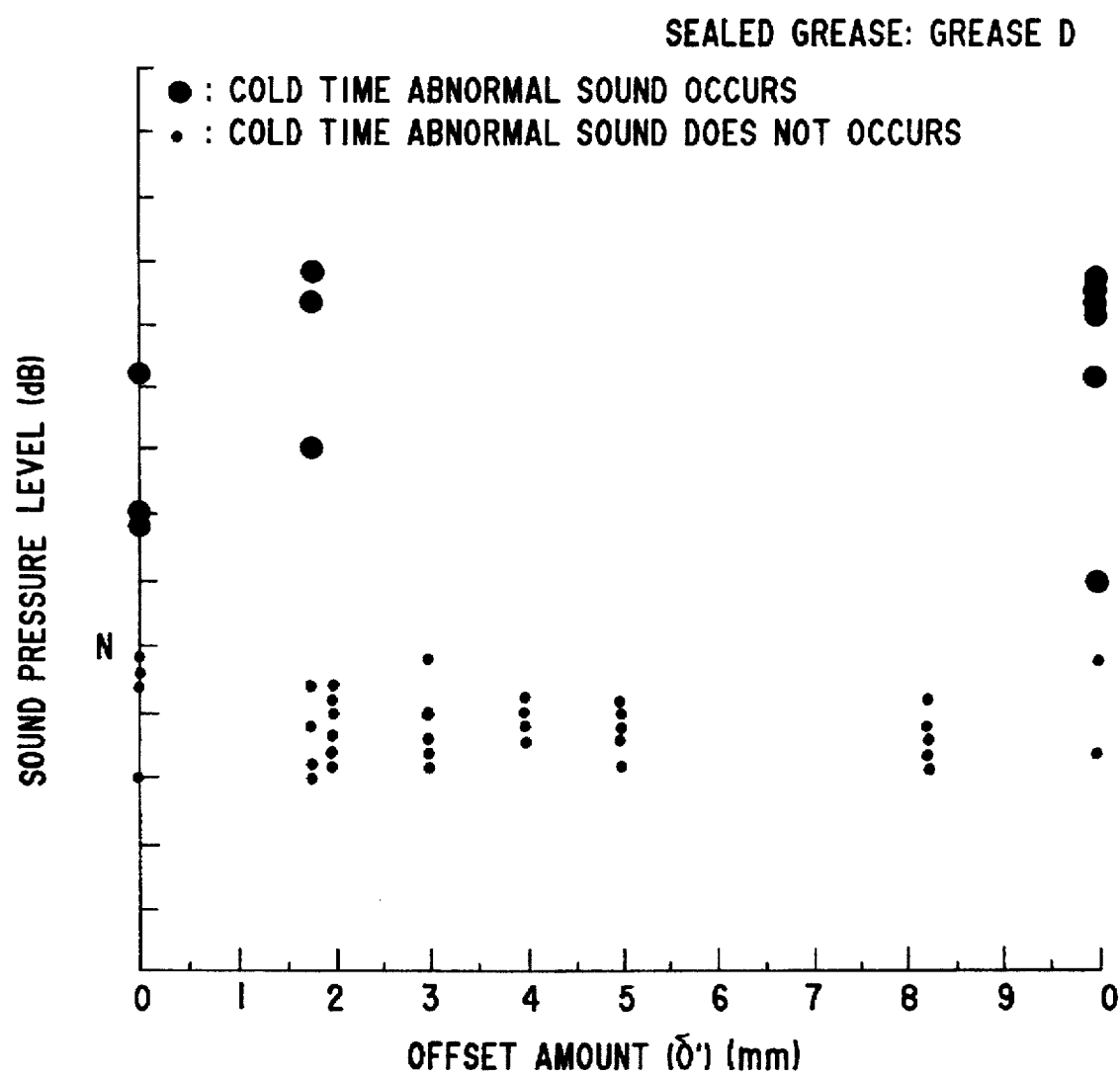
FIG. 28 is a graph showing the relation between the offset amount and the sound pressure level.
Figure 29:
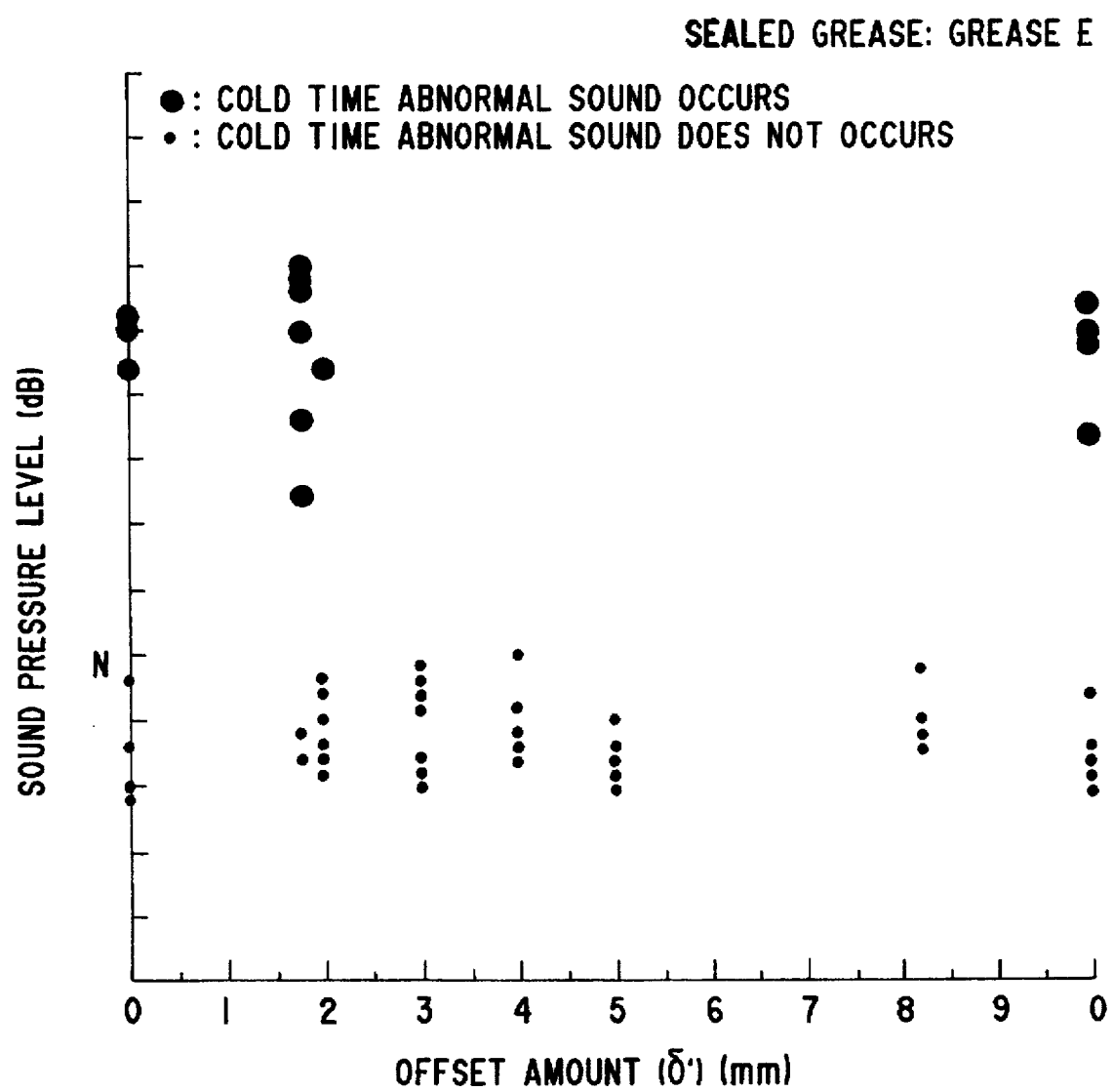
FIG. 29 is a graph showing the relation between the offset amount and the sound pressure level.

FIGS. 27 through 29 show the relation between the offset amount δ' (mm) and the sound pressure level (dB) of sound. Sounds having a sound pressure of N dB and above are cold time abnormal sounds. FIG. 27 refers to the test result in the case where grease C is sealed in the ball bearing 2 and FIG. 28 refers to the test result in the case where grease E is sealed in the ball bearing 2. The operating conditions are the same for both cases.

In FIGS. 27 through 29, when the offset amount δ'=2 mm or below, occurrence of cold time abnormal sound was observed. However, in the region where 2 mm<δ', occurrence of cold time abnormal sound is prevented.

It has become clear from the above test results that occurrence of cold time abnormal sound can be prevented irrespective of the kind of the sealed grease by setting the offset amount δ (δ') at a value above a predetermined value.

Figure 2:
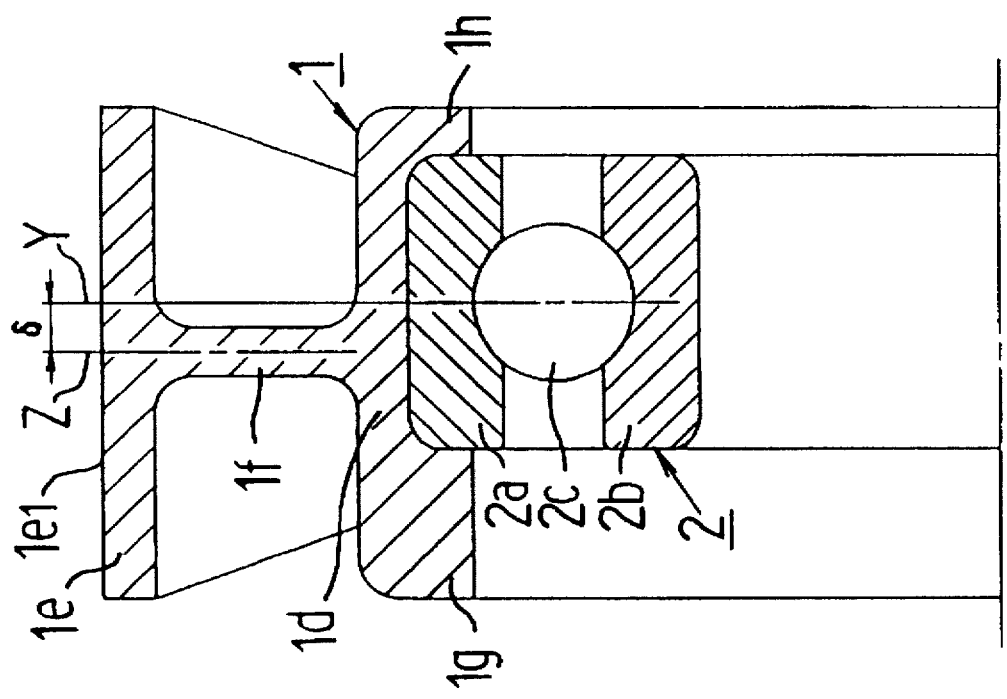
FIG. 2 is a sectional view showing an embodiment of the present invention.

An idler pulley shown in FIG. 2 differs in the shape of the pulley body 1 from the arrangement shown in FIG. 1. The pulley body 1 in this embodiment is in the form of an annular body comprising an inner diameter cylindrical portion 1d fitted on a ball bearing 2, an outer diameter cylindrical portion 1e for wrapping a belt therearound, a connecting portion 1f for connecting the inner and outer diameter cylindrical portions 1d and 1e, and flange portions 1g and 1h extending inwardly from the opposite ends of the inner diameter cylindrical portion 1d. The outer race 2a of the ball bearing 2 is fitted in the inner diameter of the inner diameter cylindrical portion 1d and is held in position at axially opposite sides by the flange portions 1g and 1h. A pulley peripheral surface 1e1 to be contacted by the belt is provided on the outer diameter of the outer diameter cylindrical portion 1e. The contact position Z on the pulley peripheral surface 1e1 contacted by the belt center, and the bearing centerline Y of the ball bearing 2 are axially offset from each other by an amount δ.

Figure 3:
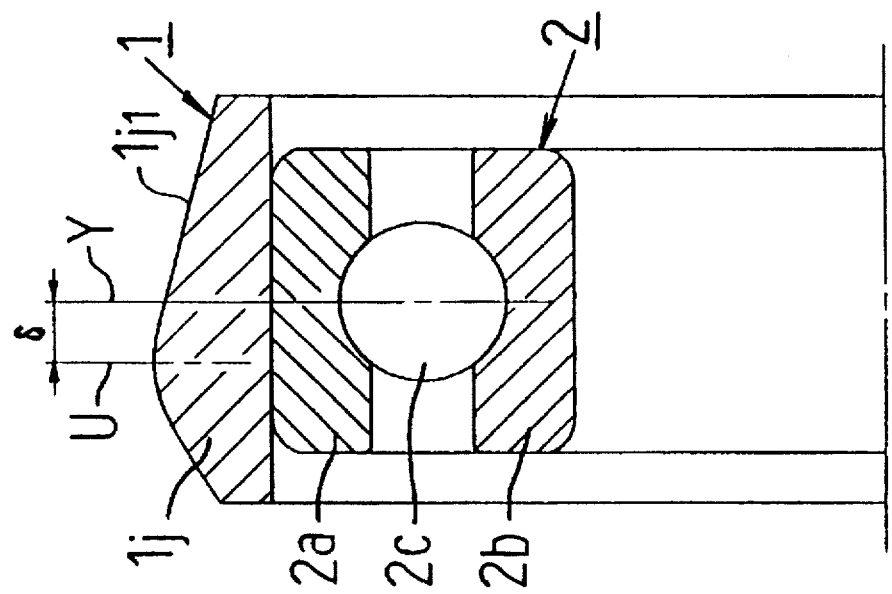
FIG. 3 is a sectional view showing an embodiment of the present invention.

An idler pulley shown in FIG. 3 is provided with a crowning on the pulley peripheral surface 1j1 of the pulley body 1, and the convex center U of said crowning, and the bearing centerline Y of the ball bearing 2 are axially offset from each other by an amount δ. During running of the belt, the belt center coincides with the convex center U of the crowning and is offset from the axial centerline Y by a predetermined amount. In addition, the pulley body 1 of this embodiment is in the form of an annular body comprising a cylindrical portion 1j, with the outer race 2a of the ball bearing 2 fitted in the inner diameter of the cylindrical portion 1j, and a pulley peripheral surface 1j1 is provided on the outer diameter of the cylindrical portion 1j. The axial centerline of the pulley peripheral surface 1j1 coincides with the bearing centerline Y of the ball bearing 2.

Figure 4:
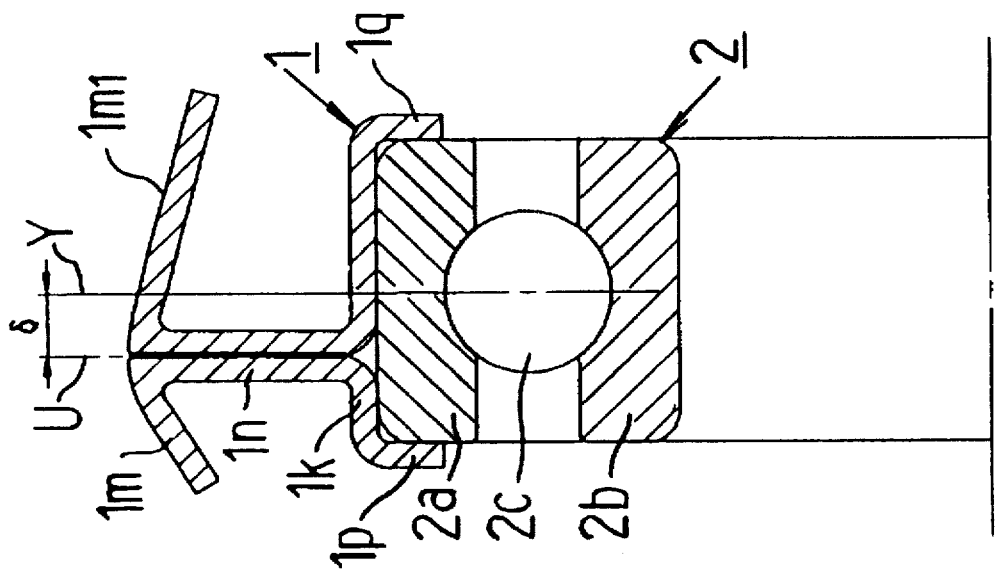
FIG. 4 is a sectional view showing an embodiment of the present invention.

An idler pulley shown in FIG. 4 differs in the shape of the pulley body 1 from the arrangement shown in FIG. 3. The pulley body 1 in this embodiment is made, e.g., by putting two pressed members of steel plate together to form an annular body comprising an inner diameter cylindrical portion 1k fitted on a ball bearing 2, an outer diameter cylindrical portion 1m for wrapping a belt therearound, a connecting portion 1n for connecting the inner and outer diameter cylindrical portions 1k and 1m, and flange portions 1p and 1q extending inwardly from the opposite ends of the inner diameter cylindrical portion 1k. The outer race 2a of the ball bearing 2 is fitted in the inner diameter cylindrical portion 1k and is held in position at axially opposite sides by the flange portions 1p and 1q. A pulley peripheral surface 1m1 to be contacted by the belt is provided on the outer diameter cylindrical portion 1m. And the convex center U of the crowning provided on the pulley peripheral surface and the bearing centerline Y of the ball bearing 2 are axially offset from each other by an amount δ.

Figure 5:
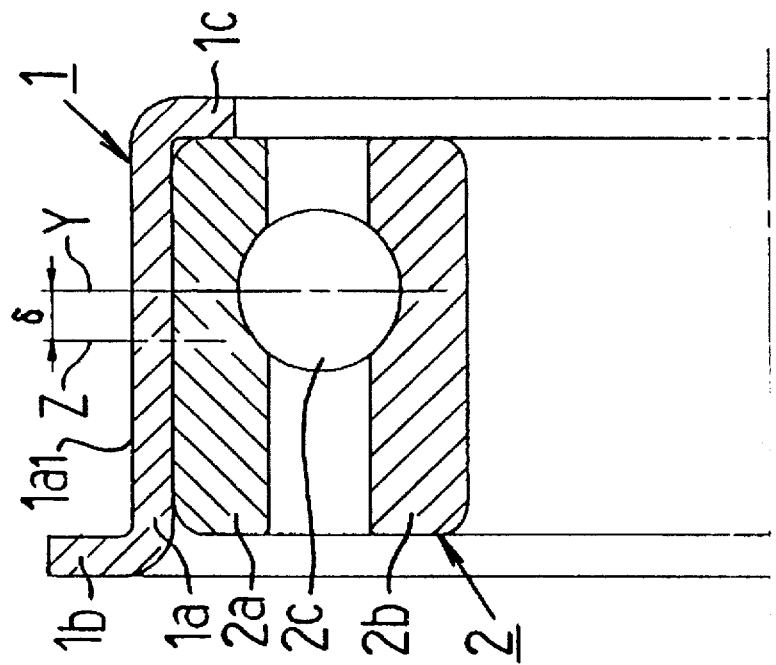
FIG. 5 is a sectional view showing an embodiment of the present invention.

In an idler pulley shown in FIG. 5, the ball bearing 2 is of asymmetrical shape. The pulley body 1 is of the same shape as in the arrangement shown in FIG. 1. Since the ball bearing 2 is of asymmetrical shape, the contact position Z on the pulley peripheral surface 1a1 contacted by the belt center, and the bearing centerline Y of the ball bearing 2 are axially offset from each other by an amount δ.

Figure 6:
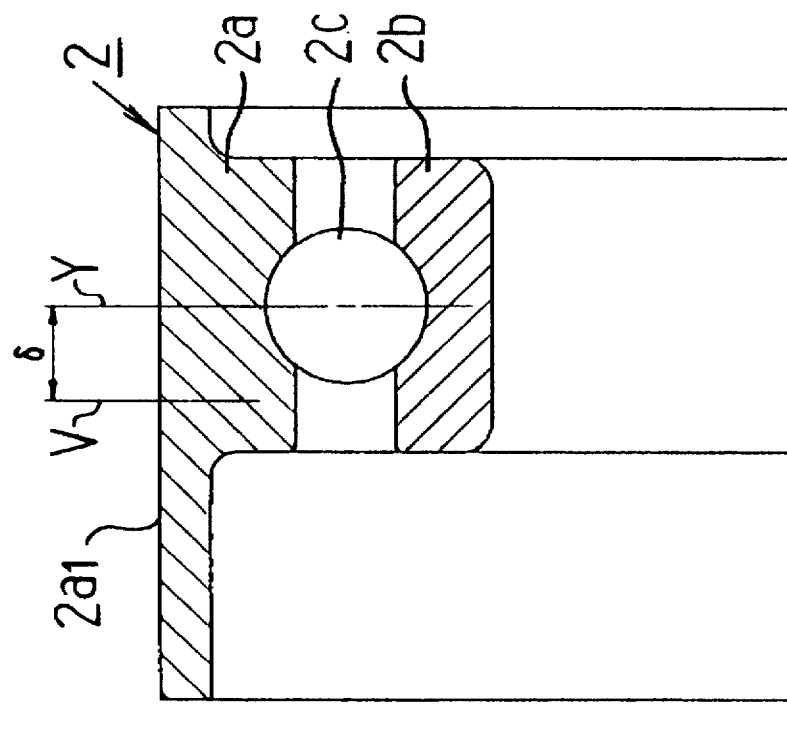
FIG. 6 is a sectional view showing an embodiment of the present invention.

In an idler pulley shown in FIG. 6, the pulley peripheral surface 2a1 to be contacted by the belt is provided directly on the outer race 2a (hat type outer race) of a ball bearing, and the contact position V on the pulley peripheral surface 2a1 contacted by the belt center, and the bearing centerline Y of the ball bearing 2 are axially offset from each other by an amount δ. In addition, the idler pulley in this embodiment does not have a pulley body 1 provided in the above preceding embodiments.

Figure 7:
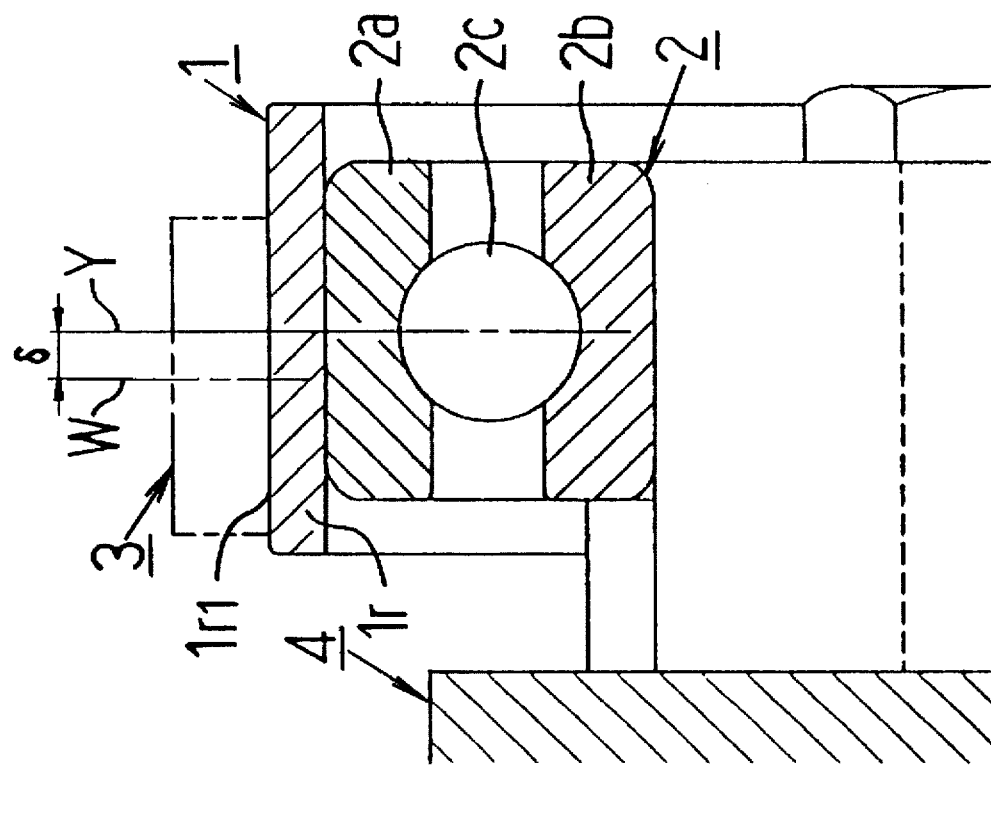
FIG. 7 is a sectional view showing an embodiment of the present invention.

An idler pulley shown in FIG. 7 is mounted on an engine block in such a manner that the contact position W on the pulley peripheral surface 1r1 contacted by the belt center of the belt 3, and the bearing centerline Y of the ball bearing 2 are axially offset from each other by an amount δ. In addition, the pulley body 1 in this embodiment is in the form of an annular body comprising a cylindrical portion 1r, with the outer race of a ball bearing 2 fitted in the inner diameter of the cylindrical portion 1r and with a pulley peripheral surface 1r1 provided on the outer diameter of the cylindrical portion 1r for contact with a belt 3.

Embodiments shown in FIGS. 8 through 12 relate to an arrangement wherein the load center W of a belt load acting on a ball bearing 2, and the bearing centerline Y of the ball bearing 2 are axially offset from each other by an amount δ. Putting the load center W and the bearing centerline Y in offset relation to each other results in a moment load acting on the ball bearing 2, inclining the outer race 2a. And the inclination of the outer race with respect to the bearing centerline Y, in turn, results in an inclination between the raceway surfaces of the outer and inner races 2a and 2b, with the rolling elements (balls 2c) rolling while contacting the raceway surfaces of the inner and outer races 2b and 2a at a contact angle (at a position away from the groove bottom) with a surface pressure greater than a predetermined value. Thus, the same functions and effects as those in the preceding embodiments can be obtained.

Figure 8:
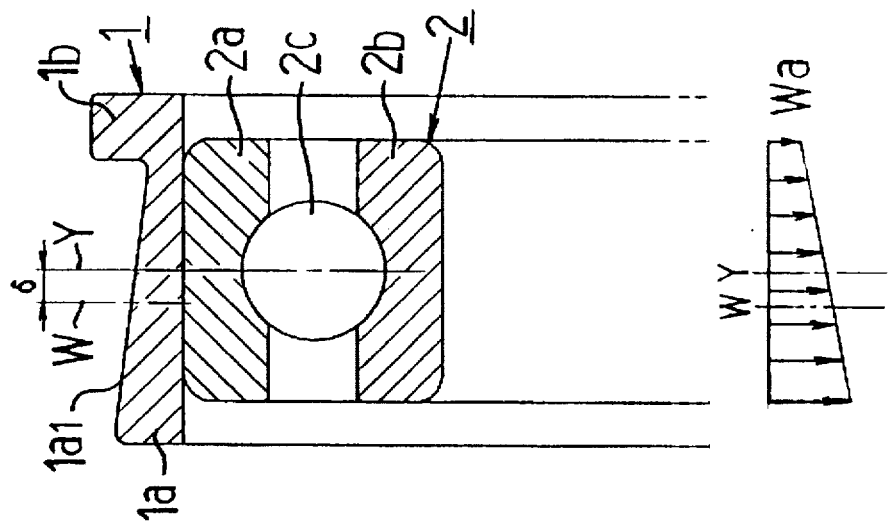
FIG. 8 is a sectional view showing an embodiment of the present invention.

In an idler pulley shown in FIG. 8, the pulley body 1 is in the form of an annular body comprising a cylindrical portion 1a and a flange portion 1b extending outward from the right-hand end of the cylindrical body 1. The cylindrical body 1 has the outer race 2a of a ball bearing 2 fitted in the inner diameter thereof, the outer diameter being formed with a pulley peripheral surface 1a1 to be contacted by an unillustrated belt. The pulley peripheral surface 1a1 is a conical taper surface, the larger diameter being on the left-hand side and the smaller diameter being on the right-hand side.

When the belt contacts the conical taper-shaped pulley peripheral surface 1a1, the belt load is distributed such that it is high at the larger diameter side of the pulley peripheral surface 1a1, with the load center W being axially deviated toward the larger diameter side (left-hand side) with respect to the bearing centerline Y of the ball bearing 2 by an amount δ. In this manner, the load center W and the bearing centerline Y are rendered axially offset by an amount δ.

Figure 9:
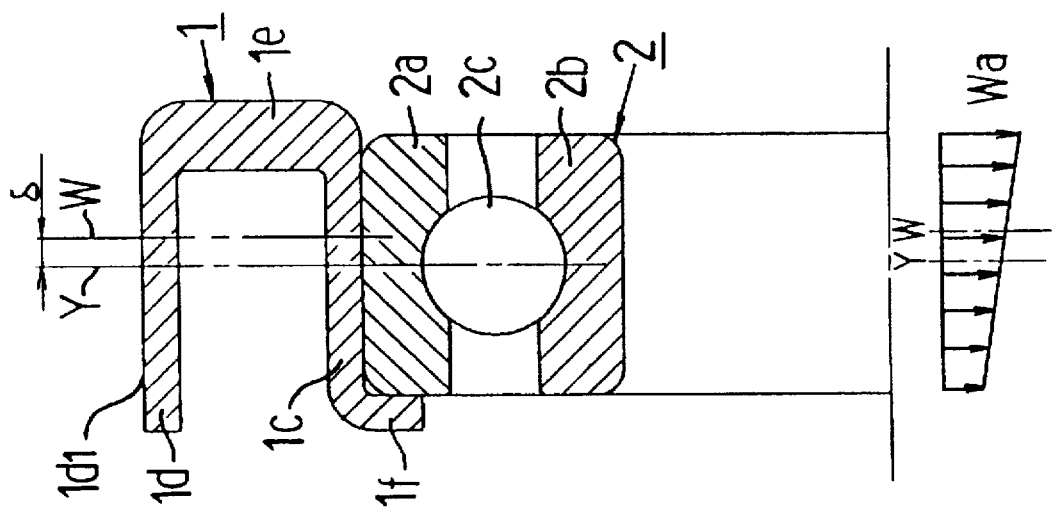
FIG. 9 is a sectional view showing an embodiment of the present invention.

In an idler pulley shown in FIG. 9, the radial rigidity of the pulley body 1 is rendered different in opposite sides to thereby render the load center W of the belt load and the bearing centerline Y of the ball bearing 2 axially offset by an amount δ. The pulley body 1 in this embodiment is in the form of an annular body comprising an inner diameter cylindrical portion 1c fitted on a ball bearing 2, an outer diameter cylindrical portion 1d for wrapping a belt therearound, a connecting portion 1e for radially connecting the inner and outer diameter cylindrical portions 1c and 1d at their right-hand ends, and a flange portion if extending inwardly from the left-hand end of the inner diameter cylindrical portion 1c. The thickness of the connecting portion if is greater than that of the other portions. The inner diameter of the inner diameter cylindrical portion 1c has the outer race 2a of the ball bearing 2 fitted therein, and the outer diameter cylindrical portion 1d is provided with a pulley peripheral surface 1d1 to be contacted by the belt.

Since the inner and outer cylindrical portions 1c and 1d are connected together at their right-hand ends by the thick connecting portion 1e, the radial rigidity of the pulley body 1 is greater at its right-hand end. Therefore, the distribution Wa of the belt load acting on the ball bearing 2 is such that it is high at the right-hand end of the pulley body 1, with the load center W deviated toward the right-hand side with respect to the bearing centerline Y by an amount δ. In this manner, the load center W and the bearing centerline Y are rendered axially offset by an amount δ.

Figure 10B:
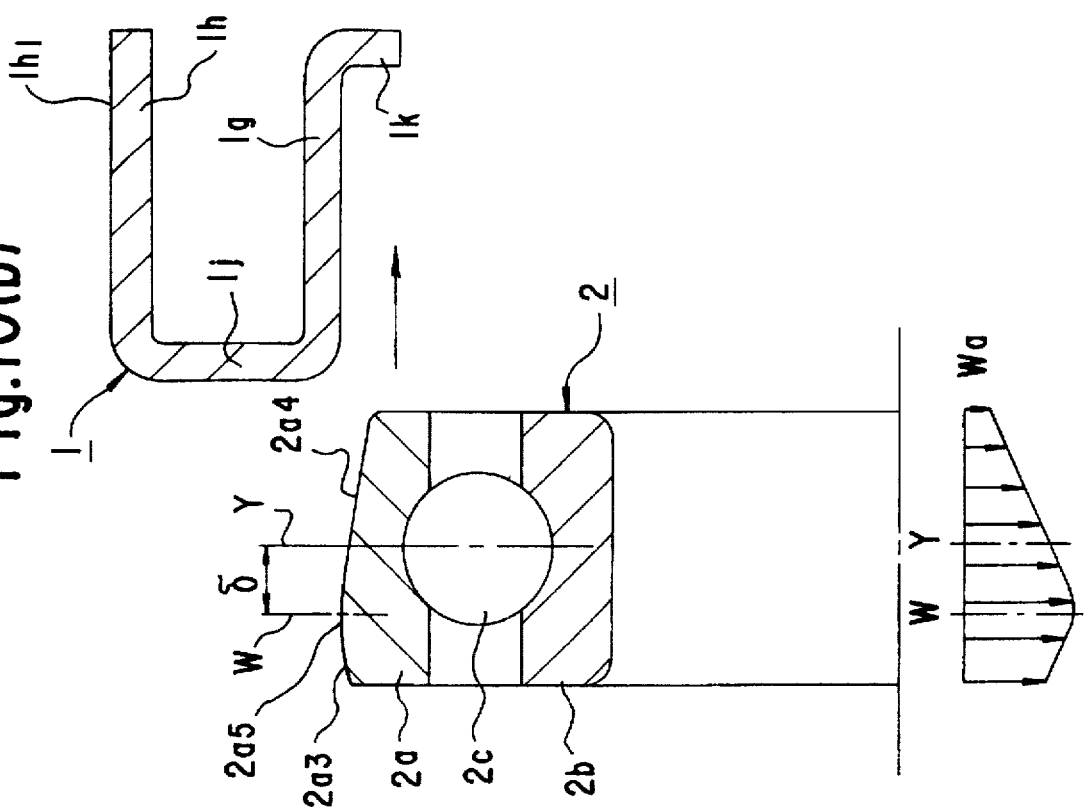
FIGS. 10(a) and 10(b) are sectional views showing an embodiment of the present invention.
Figure 10A:
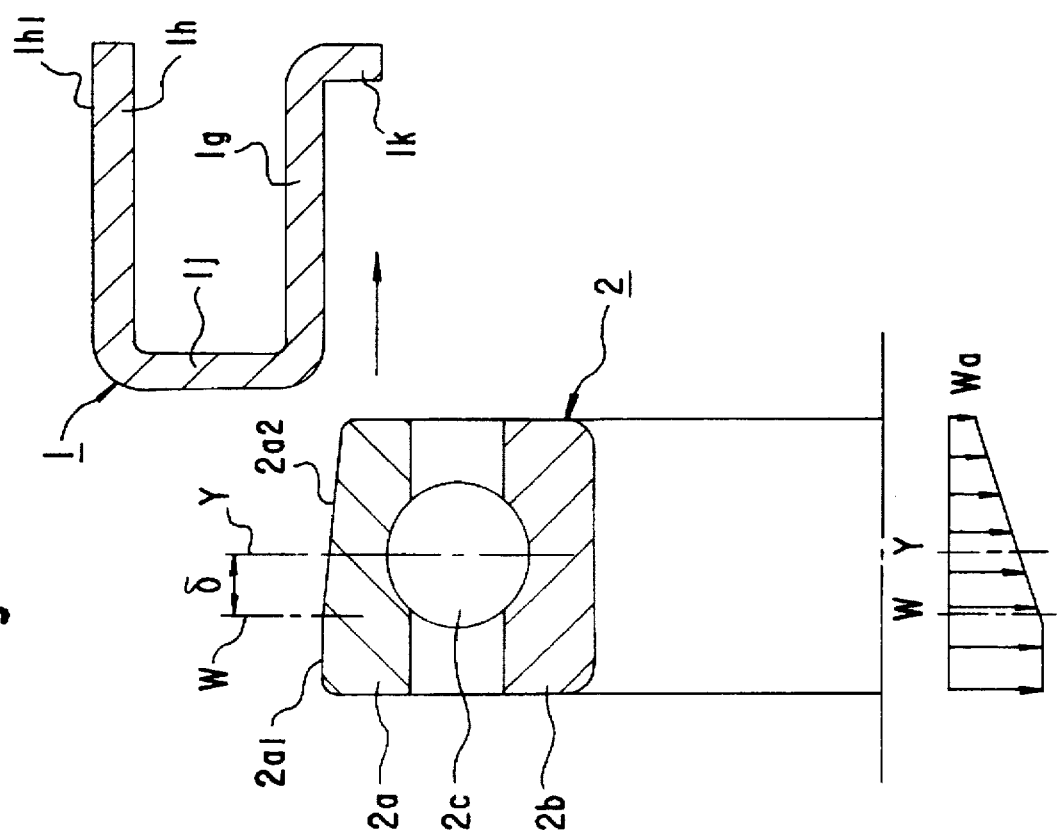

In idler pulleys shown in FIGS. 10 (a), (b), the interference between the pulley body 1 and the outer race 2a of the ball bearing 2 is rendered different in opposite sides, thereby rendering the load center W of the belt load and the bearing centerline Y of the ball bearing axially offset by an amount δ. The pulley body 1 in each of these embodiments is in the form of an annular body comprising an inner diameter cylindrical portion 1g fitted on a ball bearing 2, an outer diameter cylindrical portion 1h for wrapping a belt therearound, a connecting portion 1j for radially connecting the inner and outer diameter cylindrical portions 1g and 1h at their right-hand ends, and a flange portion 1k extending inwardly from the right-hand end of the inner diameter cylindrical portion 1g. The inner diameter of the inner diameter cylindrical portion 1g is a cylindrical surface. The pulley peripheral surface 1h1 is formed on the outer diameter of the outer diameter cylindrical portion 1h.

The outer diameter of the outer race 2a of the ball bearing 2 in FIG. 10 (a) comprises a cylindrical surface 2a1 in a predetermined region extending from the left-hand end and a conical taper surface 2a2 in a predetermined region extending from the right-hand end, said cylindrical surface 2a1 and said conical taper surface 2a2 being smoothly continuous with each other. Further, the outer diameter of the outer race 2a of the ball bearing 2 in FIG. 10 (b) comprises conical taper surfaces 2a3 and 2a4 in respective predetermined regions extending from the left- and right-hand ends, said conical taper surfaces 2a3 and 2a4 being smoothly continuous with each other through a cylindrical surface 2a5. The center of the cylindrical surface 2a5 is deviated toward the left-hand end from the bearing centerline Y 2a of the ball bearing 2.

When the outer diameter of the thus-shaped outer race 2 is fitted in the inner diameter of the inner diameter cylindrical portion 1g of the pulley body 1, the interference between the pulley body 1 and the outer race 2a is greater at the left-hand end. Therefore, the distribution Wa of the belt load acting on the ball bearing 2 is greater at the left-hand end, and the load center W is deviated toward the left-hand end with respect to the bearing centerline Y of the ball bearing 2 by an amount δ. In this manner, the load center W and the bearing centerline Y of the ball bearing 2 are rendered axially offset by an amount δ.

In an idler pulley shown in FIG. 11, the interference between the pulley body 1 and the outer race 2a of the ball bearing 2 is provided at one end only, whereby the load center W of the belt load and the bearing centerline Y of the ball bearing 2 are rendered axially offset by an amount δ. The pulley body 1 in this embodiment is in the form of an annular body comprising a cylindrical portion 1m, a flange portion in outwardly extending from the left-hand end of said cylindrical portion 1m, and a flange portion 1p inwardly extending from the right-hand end of said cylindrical portion 1m. The inner diameter of the cylindrical portion 1m has the outer race 2a of the ball bearing 2 fitted therein, and the outer diameter of the cylindrical portion 1m is provided with a pulley peripheral surface 1m1 to be contacted by a belt. The outer diameter of the outer race 2a of the ball bearing 2 is formed with a relief 2a6 extending from the right-hand end over a predetermined region.

When the outer diameter of the thus-shaped outer race 2 is fitted in the inner diameter of the cylindrical portion 1m of the pulley body 1, the interference between the pulley body 1 and the outer race 2a is concentrated in the left-hand end region where the relief 2a6 is not provided. Therefore, the belt load acting on the ball bearing 2 is concentrated in the region having this interference, with the load center W deviated toward the left-hand side with respect to the bearing centerline Y of the ball bearing 2 by an amount δ. In this manner, the load center W and the bearing centerline Y of the ball bearing 2 are rendered axially offset by an amount δ.

In an idler pulley shown in FIG. 12, the tension in the belt 3 is rendered different in the right and left sides to thereby render the load center W of the belt load and the bearing centerline Y of the ball bearing 2 axially offset by an amount δ. As for the means for making the tension in the belt 3 different in the right and left sides, there may be contemplated an arrangement wherein, as shown in FIG. 12 (b), the diameters of reinforcing wires 3 in the belt 3 are rendered different in the right and left sides, and an arrangement wherein, as shown in FIG. 12 (c), the cross-sectional height H of the belt 3 is rendered different in the right and left sides. In addition, the pulley body 1 in this embodiment is in the form of an annular body comprising a cylindrical portion 1q, and the inner diameter of the cylindrical portion 1q has the outer race 2a of the ball bearing 2 fitted therein and the outer diameter of the cylindrical portion 1q is formed with a pulley peripheral surface 1q1 to be contacted by the belt 3.

Embodiments shown in FIGS. 13 through 21 relate to an arrangement wherein an angle of inclination is provided between the pulley rotational axis X' and the axis X of the fixed shaft. The provision of an angle of inclination between the pulley rotational axis X' and the axis X of the fixed shaft results in an angle of inclination being formed between the raceway surfaces of the outer and inner races 2a and 2b, so that the rolling elements (balls 2c) roll while contacting the raceway surfaces of the inner and outer races 2b and 2a at a contact angle (at a position away from the groove bottom) with a surface pressure greater than a predetermined value. Thus, the same functions and effects as those in the preceding embodiments can be obtained.

Figure 13:
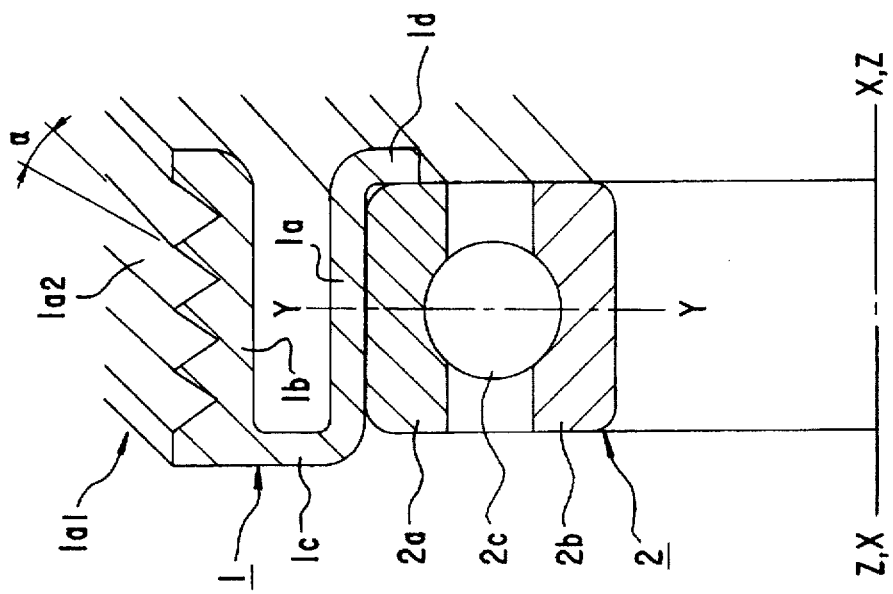
FIG. 13 is a sectional view showing an embodiment of the present invention.
Figure 14A:
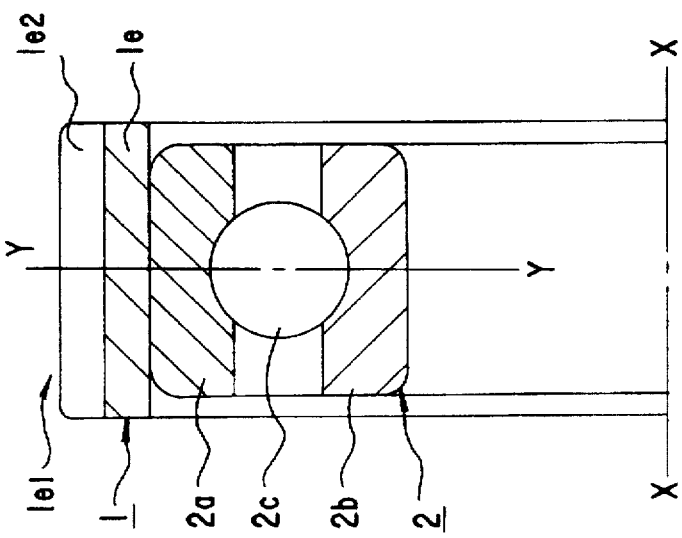
FIGS. 14(a) and (b) are sectional views showing an embodiment of the present invention.
Figure 14B:
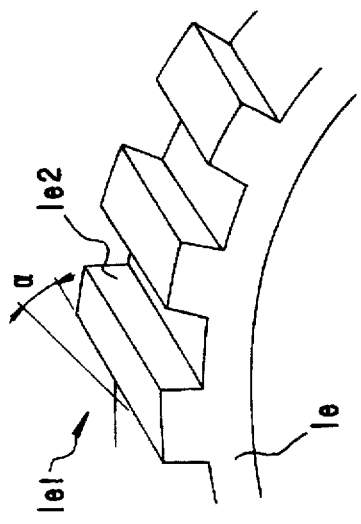

In an idler pulley shown in FIG. 13, the pulley peripheral surface 1a1 is formed with a plurality of belt engaging grooves 1a2 disposed at axially equal intervals, said belt engaging grooves 1a2 having a predetermined angle of inclination α with respect to a plane orthogonal to the axis X' of the pulley peripheral surface 1a1. In the state in which the belt lead is not acting, the axis X' of the pulley peripheral surface 1a1 coincides with the axis X of the fixed shaft. The plane including the groove bottom of the raceway surface of the inner race 2b of the ball bearing 2 is orthogonal to the axis X of the fixed shaft. Therefore, there is an angle of inclination α defined between the direction of travel of the belt engaging grooves 1a2 and the direction of travel of the raceway surface of the inner race 2b.

When a belt (corrugated-surface belt) contacting the belt engaging grooves 1a2 travels in a plane orthogonal to the axis X of the fixed shaft, the pulley body 1 and the outer race 2a of the ball bearing 2 fitted therein are inclined in the direction to correct the angle of inclination α of the belt engaging grooves 1a2 with respect to the pulley body 1. As a result, the axis X' of the pulley peripheral surface 1a1 (pulley rotational axis X') is inclined with respect to the axis X of the fixed shaft by an angle of inclination α and the outer race 2a is inclined with respect to the bearing centerline Y, producing an oblique state between the raceway surfaces of the outer and inner races 2a and 2b. Therefore, the balls 2c roll while contacting the raceway surfaces of the inner and outer races 2b and 2a at a contact angle (at a position away from the groove bottom) with a surface pressure greater than a predetermined value. Thereby, occurrence of cold time abnormal sound is prevented on the basis of the mechanism described above.

In an idler pulley (for a timing belt), the pulley peripheral surface of the pulley body 1 is formed with a plurality of belt engaging grooves 1e2 disposed at equal circumferential intervals, and these belt engaging grooves 1e2 have a predetermined angle of inclination α with respect to a plane including the axis X' of the pulley peripheral surface 1e1 (pulley rotational axis X'). In a state in which the belt load is not acting, the axis X' of the pulley peripheral surface 1e1 coincides with the axis X of the fixed shaft. Therefore, the belt engaging grooves 1e2 are inclined at an angle of inclination a with respect to the axis X of the fixed shaft. In addition, the pulley body 1 in this embodiment is in the form of an annular body comprising a cylindrical portion 1e, and the inner diameter of of the cylindrical portion 1e has the outer race 2a of the ball bearing fitted therein and the outer diameter of the cylindrical portion 1e is formed with a pulley peripheral surface 1e1 to be contacted by a belt (timing belt).

When a belt (timing belt) contacting the belt engaging grooves 1e2 travels in a plane orthogonal to the axis X of the fixed shaft, the pulley body 1 and the outer race 2a of the ball bearing 2 fitted therein are inclined in the direction to correct the angle of inclination α of the belt engaging grooves 1e2 with respect to the belt (teeth of the belt). As a result, the pulley rotational axis X' is inclined at an angle of inclination α with respect to the axis X of the fixed shaft and the outer race 2a is inclined with respect to the bearing centerline Y, producing an oblique state between the raceway surfaces of the outer and inner races 2a and 2b. Therefore, the balls 2c roll while contacting the raceway surfaces of the inner and outer races 2b and 2a at a contact angle (at a position away from the groove bottom) with a surface pressure greater than a predetermined value. Thereby, occurrence of cold time abnormal sound is prevented on the basis of the mechanism described above.

Figure 15B:
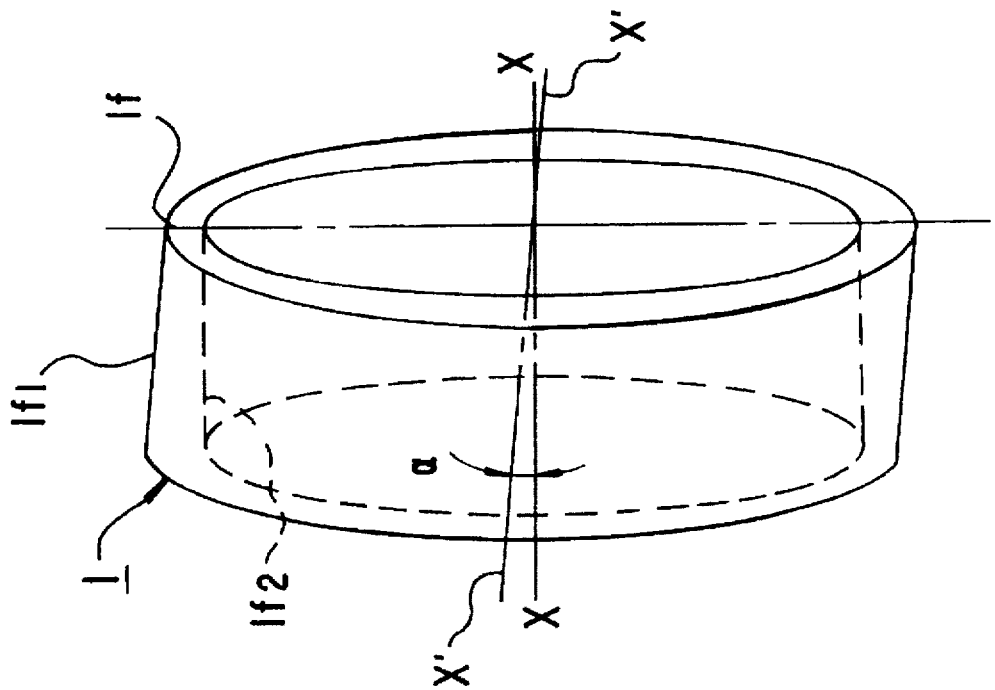
FIGS. 15(a) and 15(b) are sectional views showing an embodiment of the present invention.
Figure 15A:
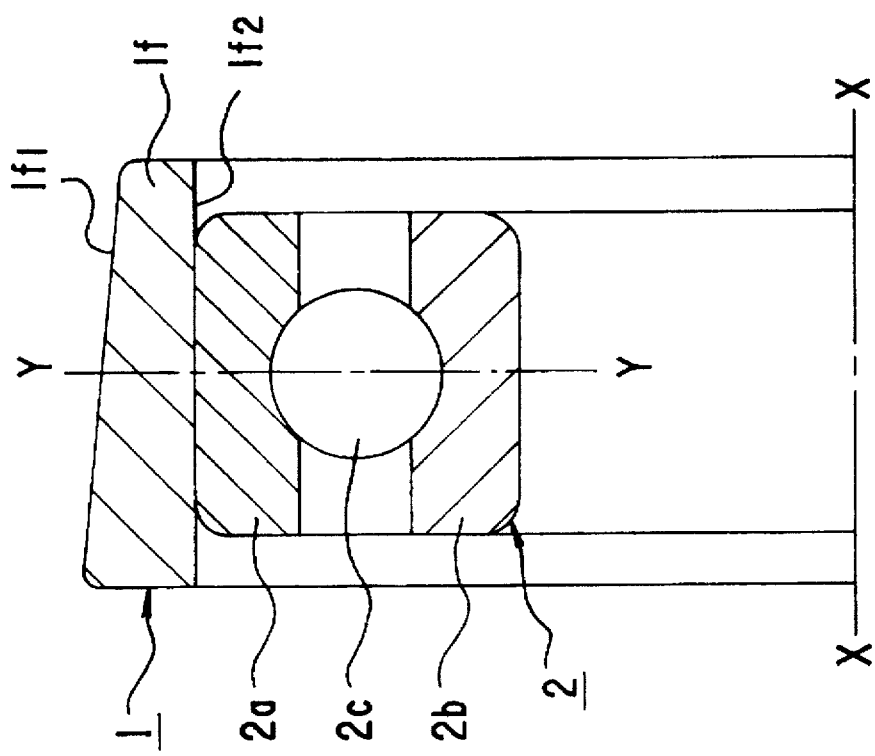

In an idler pulley shown in FIG. 15, there is an angle of inclination α defined between the axis X' (pulley rotational axis X') and the axis X of the fixed shaft. In addition, the pulley body 1 in this embodiment is in the form of an annular body comprising a cylindrical portion 1f, the axis of the inner diameter 1f2 of the cylindrical portion 1f being aligned with the axis X of the fixed shaft. The inner diameter 1f2 of the cylindrical portion 1f has the outer race 2a of the ball bearing 2 fitted therein and the outer diameter of the cylindrical portion 1f is formed with a pulley peripheral surface 1f2 to be contacted by the belt.

When the belt contacting the pulley peripheral surface 1f1 having an axis X' (pulley rotational axis X') forming an angle of inclination α with respect to the axis X of the fixed shaft travels in a plane orthogonal to the axis X of the fixed shaft, the pulley body 1 and the outer race 2a of the ball bearing 2 fitted therein are inclined in the direction to correct the angle of inclination α. As a result, the outer race 2a is inclined with respect to the bearing centerline Y, producing an oblique state between the raceway surfaces of the outer and inner races 2a and 2b. Therefore, the balls 2c roll while contacting the raceway surfaces of the inner and outer races 2b and 2a at a contact angle (at a position away from the groove bottom) with a surface pressure greater than a predetermined value. Thereby, occurrence of cold time abnormal sound is prevented on the basis of the mechanism described above.

An idler pulley shown in FIG. 16 is constructed in the same manner as in the construction shown in FIG. 15, such that there is an angle of inclination α defined between the axis X' (pulley rotational axis X') of the pulley peripheral surface 1g1 of the pulley body 1 and the axis X of the fixed shaft; however, it differs in the means for providing an angle of inclination α. That is, in this embodiment, the axis X' of the outer diameter of the outer race 2a of the ball bearing 2 is inclined at an angle of inclination a with respect to the axis X of the fixed shaft and said outer race is fitted in the inner diameter of the cylindrical portion 1g of the pulley body 1 having an axis X' (pulley rotational axis) which is likewise inclined at an angle of inclination α with respect to the axis X of the fixed shaft. In addition, the pulley body 1 in this embodiment is in the form of an annular body comprising a cylindrical portion 1g having an axis X' inclined at an angle of inclination α with respect to the axis X of the fixed shaft, a flange portion 1h extending inwardly from one end of the cylindrical portion 1g, and a flange portion 1j extending outwardly from the other end of the cylindrical portion 1g. The inner diameter of the cylindrical portion 1g has the outer race 2a of the ball bearing 2 fitted therein and the outer diameter of the cylindrical portion 1g is formed with a pulley peripheral surface 1g1 for guiding the belt.

An idler pulley shown in FIG. 17 is constructed in the same manner as in the construction shown in FIGS. 15 and 16, such that there is an angle of inclination α defined between the axis X' (pulley rotational axis X') of the pulley peripheral surface 1k1 of the pulley body 1 and the axis X of the fixed shaft; however, it differs in the means for providing an angle of inclination α. That is, in this embodiment, the axis of the inner diameter of the inner race 2b of the ball bearing 2 which serves as the axis X of the fixed shaft is inclined at an angle of inclination α with respect to the axis X' of the pulley peripheral surface 1k1. In addition, the pulley body 1 in this embodiment is in the form of an annular body comprising a cylindrical portion 1k having an axis X' which is perpendicular to the bearing centerline Y, a flange portion 1m extending inwardly from one end of the cylindrical portion 1k, and a flange portion in extending outwardly from the other end of the cylindrical portion 1k. The inner diameter of the cylindrical portion 1k has the outer race 2a of the ball bearing 2 fitted therein and the outer diameter of the cylindrical portion 1k is formed with a pulley peripheral surface 1k1 to be contacted by the belt.

When the inner race 2b is fitted on the fixed shaft, the pulley body 1 and the outer race 2a of the ball bearing 2 are inclined at an angle of inclination α with respect to the axis X of the fixed shaft. And when the belt travels in a plane orthogonal to the axis X of the fixed shaft, the pulley body 1 and the outer race 2a are inclined in the direction to correct the angle of inclination α. As a result, the outer race 2a is inclined with respect to the bearing centerline Y, producing an oblique state between the raceway surfaces of the outer and inner races 2a and 2b.

An idler pulley shown in FIG. 18 is constructed such that the plane including the groove bottom circle of the raceway surface 2a1 (rotatable raceway surface) of the outer race 2a of the ball bearing 2 is inclined at an angle of inclination α with respect to the plane which is orthogonal to the axis X of the fixed shaft. The plane including the groove bottom circle of the raceway surface 2b1 (fixed raceway surface) of the inner race 2b is orthogonal to the axis X of the fixed shaft. Therefore, the axis of the raceway surface 2a1 (rotatable raceway surface) and the raceway surface 2b1 (fixed raceway surface) are inclined at an angle of inclination α with respect to each other.

Since the raceway surfaces 2a1 and 2b1 are inclined at an angle of inclination α with respect to each other, the balls 2c roll while contacting the raceway surfaces 2a1 and 2b1 at a contact angle (at a position away from the groove bottom) with a surface pressure greater than a predetermined value. Thereby, occurrence of cold time abnormal sound is prevented on the basis of the mechanism described above. In addition, the pulley body 1 in this embodiment is in the form of an annular body comprising a cylindrical portion 1p, a flange portion 1q extending inwardly from one end of the cylindrical portion 1p, and a flange portion 1r extending outwardly from the other end of the cylindrical portion 1p. The inner diameter of the cylindrical portion 1p has the outer race 2a of the ball bearing 2 fitted therein and the outer diameter of the cylindrical portion 1p is formed with a pulley peripheral surface 1p1 to be contacted by the belt.

Figure 19:
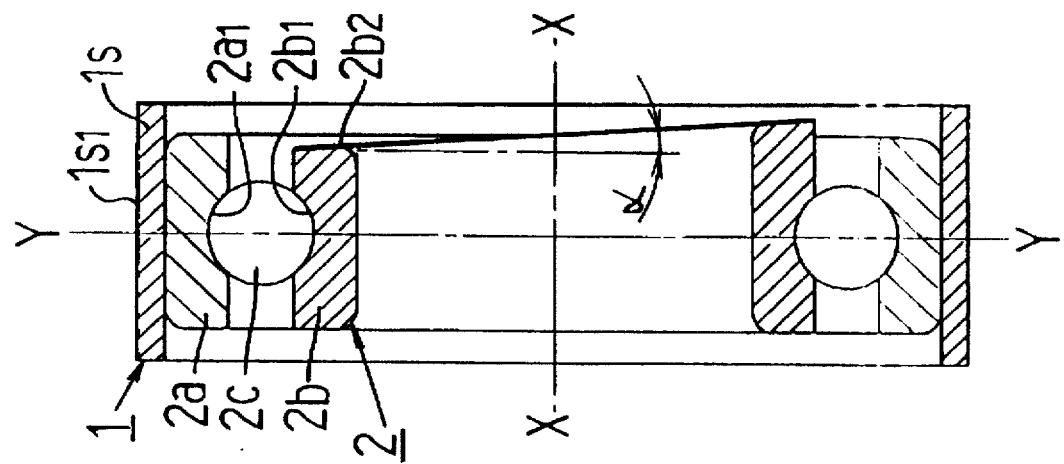
FIG. 19 is a sectional view showing an embodiment of the present invention.

In an idler pulley shown in FIG. 19, one end surface 2b2 of the inner race 2b of the ball bearing 2 is inclined at an angle of inclination α with respect to the plane which is orthogonal to the axis X of the fixed shaft. When the unillustrated fixed shaft is loosely fitted in the inner diameter of the inner race 2b and the inclined end surface 2b2 of the inner race 2b is abutted against the shoulder of the fixed shaft, the inner race 2b is inclined with respect to the fixed shaft. Therefore, there is produced an oblique state between the raceway surface 2a1 of the outer race 2a and the raceway surface 2b1 of the inner race 2b, and the balls 2c roll while contacting the raceway surfaces 2a1 and 2b1 at a contact angle (at a position away from the groove bottom) with a surface pressure greater than a predetermined value. Thereby, occurrence of cold time abnormal sound is prevented on the basis of the mechanism described above. In addition, the pulley body 1 in this embodiment is in the form of an annular body comprising a cylindrical portion 1s, and the inner diameter of the cylindrical portion is has the outer race 2a of the ball bearing 2 fitted therein and the outer diameter of the cylindrical portion 1s is formed with a pulley peripheral surface 1p1 to be contacted by the belt.

Figure 20:
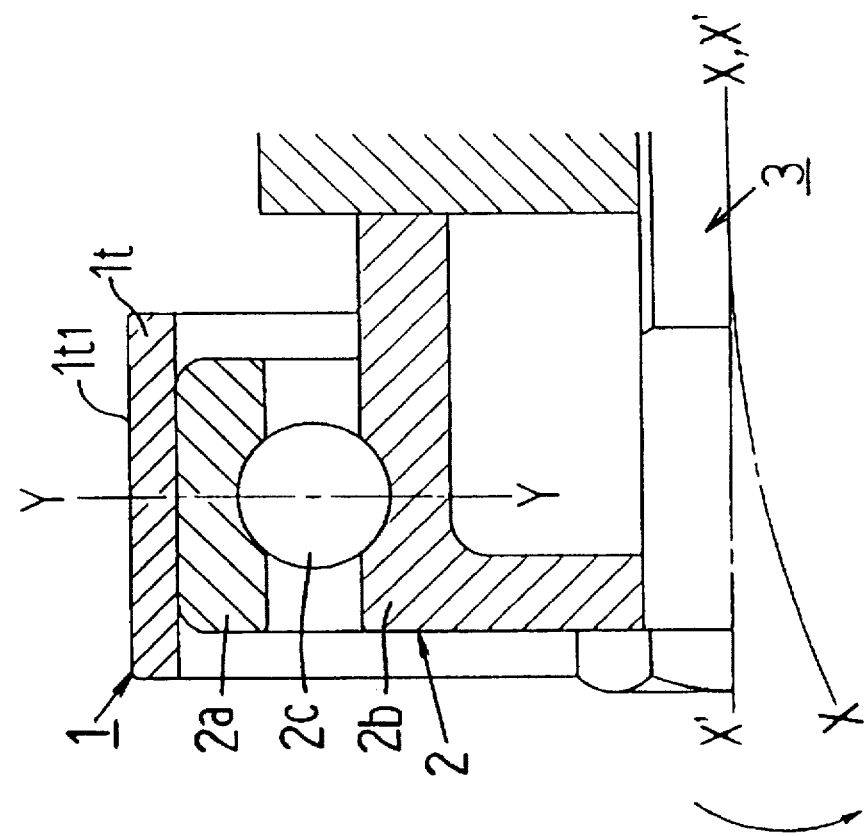
FIG. 20 is a sectional view showing an embodiment of the present invention.

An idler pulley shown in FIG. 20 is constructed such that the rigidity of the fixed shaft 3 fitted in the inner diameter of the inner race 2b of the ball bearing 2 is locally weakened to cause the belt load to produce some bending therein, thereby producing an inclination between the pulley rotational axis X' (the axis of the pulley peripheral surface 1t1) and the axis X of the fixed shaft.

The bending of the fixed shaft 3 causes the inner race 2a to incline with respect to the bearing centerline Y, producing an oblique state between the raceway surfaces of the outer and inner races 2a and 2b. Thus, the balls 2c roll while contacting the raceway surfaces of the inner and outer races 2b and 2a at a contact angle (at a position away from the groove bottom) with a surface pressure greater than a predetermined value. Thereby, occurrence of cold time abnormal sound is prevented on the basis of the mechanism described above. In addition, the pulley body 1 in this embodiment is in the form of an annular body comprising a cylindrical portion 1t, and the inner diameter of the cylindrical portion 1t has the outer race 2a of the ball bearing 2 fitted therein and the outer diameter of the cylindrical portion 1t is formed with a pulley peripheral surface 1t1 to be contacted by the belt.

An embodiment shown in FIG. 21 is designed such that an inclination is produced between the pulley rotational axis X' and the axis X of the fixed shaft by the positional relation (layout) between the idler pulley and the belt. It differs in this point from the embodiments shown in FIGS. 13–17 and 19–20 in which the idler pulley itself (including the fixed shaft) has a construction adapted to produce an inclination between the axes.

In this embodiment, the belt 4 travels in a plane which is inclined at an angle of inclination α with respect to a plane which is orthogonal to the axis X of the fixed shaft. Therefore, the pulley body and the outer race of the ball bearing fitted therein are inclined with respect to the bearing centerline, with the result that an inclination is produced between the pulley rotational axis X' and the axis X of the fixed shaft. The oblique travel of the belt as described above may be effected, for example, by shifting the grooves and ridges in the belt engaging grooves (V grooves) of the pulley peripheral surface by one unit between idler pulleys 6 and 7 disposed on the opposite sides of the idler pulley 5.

Figure 22:
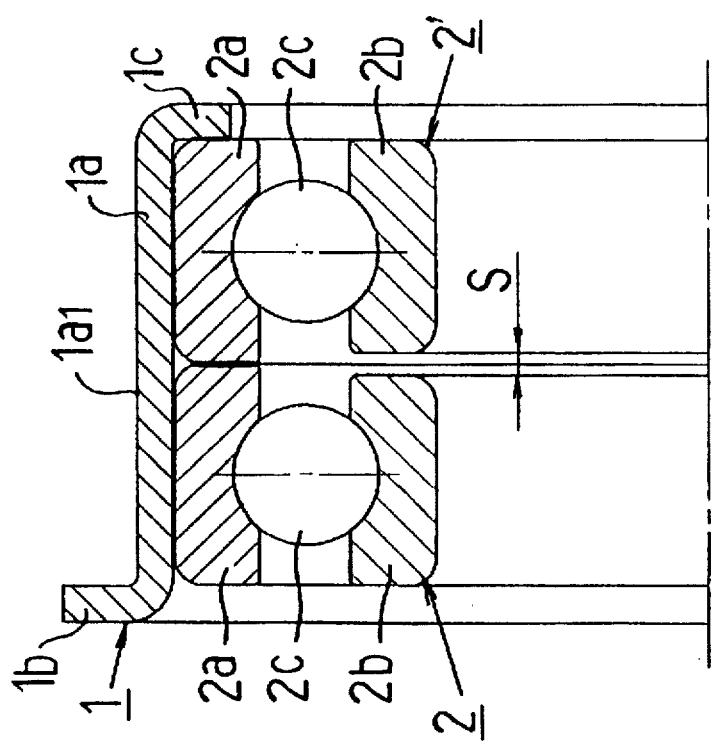
FIG. 22 is a sectional view showing an embodiment of the present invention.
Figure 23:
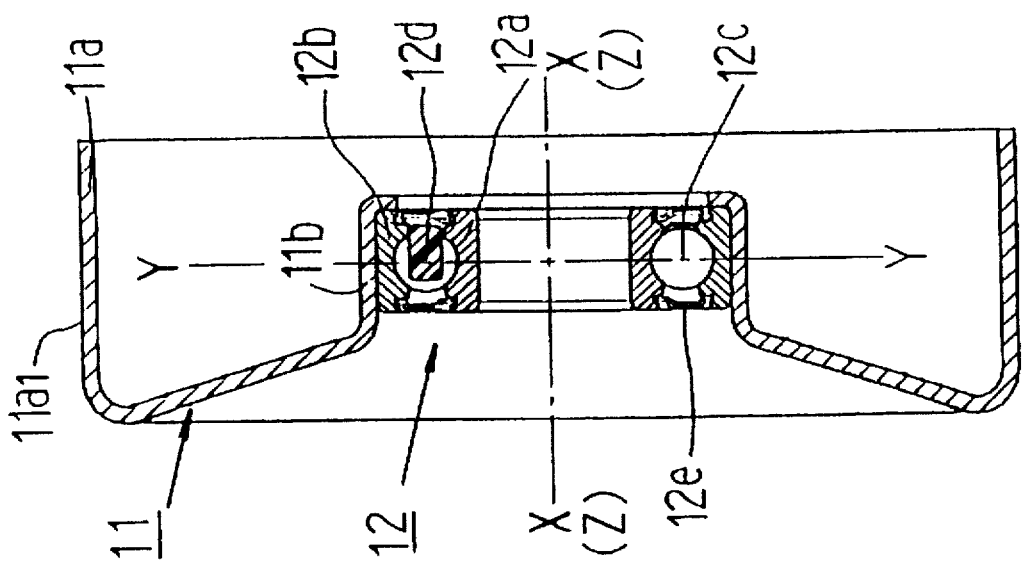
FIG. 23 is a sectional view showing a conventional idler pulley.

An embodiment shown in FIG. 22 relates to an arrangement wherein ball bearings 2' are axially preloaded. An idler pulley in this embodiment comprises a pulley body 1 made, e.g., by pressing a steel plate, and a pair of ball bearings 2'. The pulley body 1 is in the form of an annular body comprising a cylindrical portion 1a, a flange portion 1b extending outwardly from one end of the cylindrical body 1a, and a flange portion 1c extending inwardly from the other end of the cylindrical body 1a. The ball bearings 2' are deep groove ball bearings, each comprising an outer race 2a fitted in the inner diameter of the cylindrical portion 1a of the pulley body 1, an inner race 2b fitted on an unillustrated fixed shaft, a plurality of balls 2c incorporated between the raceway surfaces of the inner and outer races 2b and 2a, a retainer (omitted from illustration) for holding the balls 2c at equal circumferential intervals, and a pair of seals (omitted from illustration) for sealing grease. The pair of ball bearings 2' are arranged side by side, fitted in the inner diameter of the cylindrical portion 1a of the pulley body 1. The opposed end faces of the outer races 2a are contacted with each other, while a predetermined clearance S is defined between the opposed end surfaces of the inner races 2b. And when an unillustrated fixed shaft is fitted in the inner diameters of the inner races 2b and the inner races 2b are tightened to reduce the clearance S, the ball bearings 2' obtain a predetermined angle of contact and are axially preloaded by a predetermined amount.

When the ball bearings 2' are axially preloaded in the manner described above, the balls 2c contact the raceway surfaces of the inner and outer races 2b and 2a at an angle of contact with a surface pressure greater than a predetermined value. Thus, the behavior, particularly axial behavior, of the balls 2c is suppressed, and self-oscillation is effectively suppressed.

In the above embodiments, pulley bodies of various shapes have been shown by way of example; the present invention may be embodied irrespective of the shape of the pulley body 1. Further, the invention is likewise applicable to an idler pulley of a type in which the pulley peripheral surface to be contacted by the belt is formed directly on the outer diameter of the outer race of a ball bearing and to an idler pulley of a type in which the fixed raceway surface is formed directly on the outer diameter of a fixed shaft.

What is claimed is:

1. An idler pulley wherein a pulley body having a pulley peripheral surface to be contacted by a belt is fitted on an outer diameter of an outer race of a ball bearing or a pulley peripheral surface to be contacted by a belt is integrally formed on an outer diameter of an outer race of a ball bearing, said idler pulley being characterized in that rolling elements of said ball bearing are in contact with raceway surfaces of an inner race and said outer race of said ball bearing which have a predetermined inclination defined therebetween.

2. An idler pulley as set forth in claim 1, wherein a center of said belt and a bearing centerline of said ball bearing are offset with respect to each other.

3. An idler pulley as set forth in claim 1, wherein a contact position on said pulley peripheral surface contacted by a center of said belt and a bearing centerline of said ball bearing are axially offset with respect to each other.

4. An idler pulley as set forth in claim 1, wherein a load center of a belt load of said belt acting on said ball bearing and a bearing centerline of said ball bearing are axially offset with respect to each other.

5. An idler pulley as set forth in claim 1, wherein said pulley body is fitted on the outer diameter of the outer race having a rotational-side raceway surface, or an inner peripheral surface of said pulley body is formed with a rotational-side raceway surface, and an inner race of the ball bearing having a fixed-side raceway surface is fitted on a fixed shaft, or a fixed-side raceway surface is formed on an outer peripheral surface of a fixed shaft, said idler pulley being characterized in that there is an angle of inclination defined between a pulley rotational axis of said idler pulley and an axis of said fixed shaft.

6. An idler pulley as set forth in claim 5, wherein there is an inclination defined between a direction of travel of belt engaging grooves formed in said pulley peripheral surface and a direction of travel of said fixed-side raceway surface.

7. An idler pulley as set forth in claim 5, wherein there is an inclination defined between an axis of said pulley peripheral surface and the axis of said fixed shaft.

8. An idler pulley as set forth in claim 1, wherein said pulley body is fitted on the outer diameter of the outer race having a rotational-side raceway surface, or an inner peripheral surface of said pulley body is formed with a rotational-side raceway surface, and an inner race of the ball bearing having a fixed-side raceway surface is fitted on a fixed shaft, or a fixed-side raceway surface is formed on an outer peripheral surface of a fixed shaft, said idler pulley being characterized in that there is an angle of inclination defined between an axis of said rotational-side raceway surface and an axis of said fixed-side raceway surface.

9. An idler pulley wherein a pulley body having a pulley peripheral surface to be contacted by a belt is fitted on an outer diameter of an outer race of at least one ball bearing of a ball bearing assembly, said idler pulley being characterized in that said at least one ball bearing is axially preloaded.

* * * * *